US010050254B2

(12) United States Patent
Jin et al.

(10) Patent No.: US 10,050,254 B2
(45) Date of Patent: Aug. 14, 2018

(54) SECONDARY BATTERY WITH IMPROVED DESTRATIFICATION

(75) Inventors: Zoe H. Jin, Pewaukee, WI (US);
Michael S. Baxa, Brookfield, WI (US);
William J. Wruck, Whitefish Bay, WI (US); Kenneth A. Adams, Germantown, WI (US); Lisa M. Franklin, Milwaukee, WI (US); Glenn W. Andersen, Hartford, WI (US);
Edward N. Mrotek, Grafton, WI (US)

(73) Assignee: Johnson Controls Technology Company, Milwaukee, WI (US)

( * ) Notice: Subject to any disclaimer, the term of this patent is extended or adjusted under 35 U.S.C. 154(b) by 922 days.

(21) Appl. No.: 13/393,972

(22) PCT Filed: Sep. 3, 2010

(86) PCT No.: PCT/US2010/047869
§ 371 (c)(1),
(2), (4) Date: May 11, 2012

(87) PCT Pub. No.: WO2011/029035
PCT Pub. Date: Mar. 10, 2011

(65) Prior Publication Data
US 2012/0214032 A1   Aug. 23, 2012

Related U.S. Application Data

(60) Provisional application No. 61/239,979, filed on Sep. 4, 2009.

(51) Int. Cl.
*H01M 10/12* (2006.01)
*H01M 2/38* (2006.01)
(Continued)

(52) U.S. Cl.
CPC ............... *H01M 2/38* (2013.01); *B60L 11/14* (2013.01); *B60L 11/1877* (2013.01);
(Continued)

(58) Field of Classification Search
CPC .. B60L 11/14; B60L 11/1877; B60L 11/1879; B60L 2200/12; B60L 2200/18;
(Continued)

(56) References Cited

U.S. PATENT DOCUMENTS

| 529,199 A | 11/1894 | Schoop |
| 916,320 A | 3/1909 | Joel |

(Continued)

FOREIGN PATENT DOCUMENTS

| CN | 101308922 A | 11/2008 |
| CN | 101379634 A | 3/2009 |

(Continued)

OTHER PUBLICATIONS

Machine translation of German Patent Document No. 10 2006021585 B3, published Sep. 27, 2007.*

(Continued)

*Primary Examiner* — Sarah A. Slifka
*Assistant Examiner* — Lilia Nedialkova
(74) *Attorney, Agent, or Firm* — Boardman & Clark LLP

(57) ABSTRACT

The present disclosure relates to lead-acid batteries and the manufacture of lead-acid batteries containing acid pump devices to promote the circulation of electrolyte within the battery and/or battery cells to reduce acid stratification and improve battery performance. In various embodiments, battery cell components are assembled within an acid pump assembly that encloses the battery cell components on at least the bottom and ends. In various embodiments, at least a portion of the acid pumps may be integrally molded with or secured to various parts of the battery housing including (Continued)

the cover, side walls, and cell walls. In various embodiments; space for the acid pumps is created by varying the shape of the battery housing (e.g., the side walls or cell walls) and/or by modifying the shape, size, and or position of one or more of the battery electrodes or separators.

27 Claims, 17 Drawing Sheets

(51) Int. Cl.
*H01M 10/42* (2006.01)
*B60L 11/14* (2006.01)
*B60L 11/18* (2006.01)

(52) U.S. Cl.
CPC ..... *B60L 11/1879* (2013.01); *H01M 10/4214* (2013.01); *B60L 2200/12* (2013.01); *B60L 2200/18* (2013.01); *B60L 2200/26* (2013.01); *B60L 2200/32* (2013.01); *Y02T 10/70* (2013.01); *Y02T 10/705* (2013.01); *Y02T 10/7016* (2013.01); *Y02T 10/7077* (2013.01); *Y10T 29/49108* (2015.01)

(58) Field of Classification Search
CPC ............ B60L 2200/26; B60L 2200/32; H01M 10/4214; H01M 2/38; Y02T 10/70; Y02T 10/7016; Y02T 10/705; Y02T 10/7077; Y10T 29/49108
See application file for complete search history.

(56) References Cited

U.S. PATENT DOCUMENTS

| | | | |
|---|---|---|---|
| 2,584,117 A | 2/1952 | Elrode, Jr. | |
| 4,283,467 A | 8/1981 | Gutlich et al. | |
| 4,308,322 A | 12/1981 | Hammar | |
| 4,619,875 A | 10/1986 | Stahura | |
| 4,945,011 A * | 7/1990 | Tanaka | H01M 2/385 429/51 |
| 4,963,444 A | 10/1990 | Delaney | |
| 5,032,476 A | 7/1991 | Kirby | |
| 5,096,787 A | 5/1992 | Delaney et al. | |
| 5,879,831 A | 3/1999 | Ovshinsky | |
| 6,475,665 B1 * | 11/2002 | Okamoto et al. | 429/139 |
| 6,821,669 B2 | 11/2004 | Tschirch | |
| 2002/0028373 A1 | 3/2002 | Tschirch | |
| 2007/0009790 A1 | 1/2007 | Vutetakis | |
| 2011/0314663 A1 * | 12/2011 | Bauer | H01M 2/38 29/623.1 |
| 2012/0214032 A1 | 8/2012 | Mrotek et al. | |
| 2013/0202949 A1 | 8/2013 | Bremer et al. | |
| 2016/0294020 A1 | 10/2016 | Schwab et al. | |

FOREIGN PATENT DOCUMENTS

| | | | | |
|---|---|---|---|---|
| CN | 102640326 A | 8/2012 | | |
| CN | 103299450 A | 9/2013 | | |
| DE | 9115597 U1 | 5/1993 | | |
| DE | 10 2006 021576 B3 | 9/2007 | | |
| DE | 102006021585 B3 * | 9/2007 | ............ | H01M 2/024 |
| WO | WO 89/12325 A1 | 12/1989 | | |
| WO | WO 89/12326 A1 | 12/1989 | | |
| WO | WO 2008019676 A2 * | 2/2008 | | |
| WO | WO 2009077022 A1 * | 6/2009 | | |
| WO | 2012048885 A1 | 4/2012 | | |

OTHER PUBLICATIONS

International Preliminary Report on Patentability in International Serial No. PCT/US2010/047869.
Written Opinion of the International Searching Authority in International Serial No. PCT/US2010/047869.
International Preliminary Report on Patentability dated Apr. 16, 2013 International Appln. No. PCT/EP2011/005162 filed Oct. 14, 2011 (English translation).
International Search Report & Written Opinion of the International Searching Authority dated Jan. 17, 2012, International Appln. No. PCT/EP2011/005162, filed Oct. 14, 2011 (English translation).
International Search Report & Written Opinion of the International Searching Authority dated Feb. 5, 2015, International Appln. No. PCT/EP2014/073661 filed Nov. 4, 2014 (English translation).

* cited by examiner

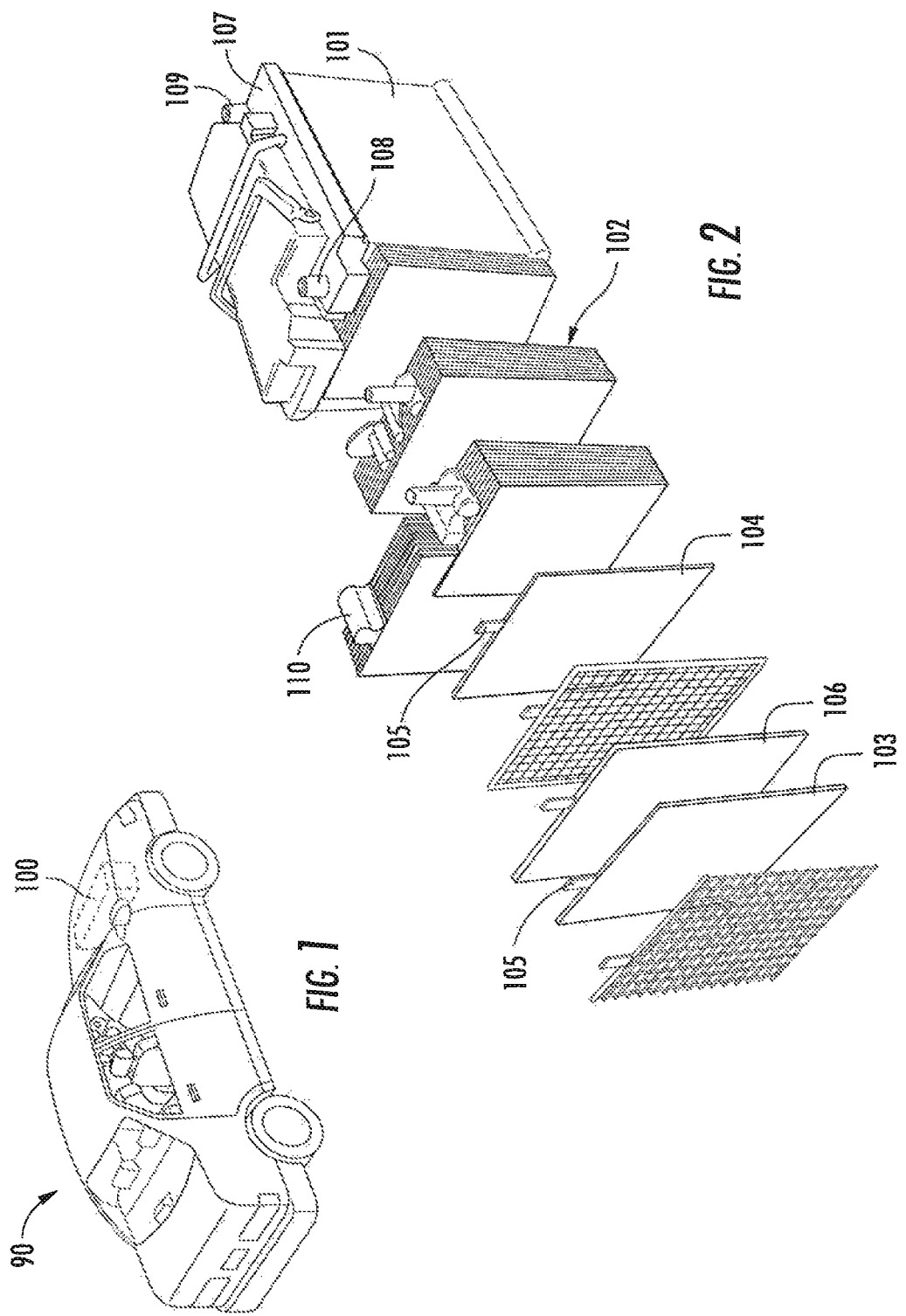

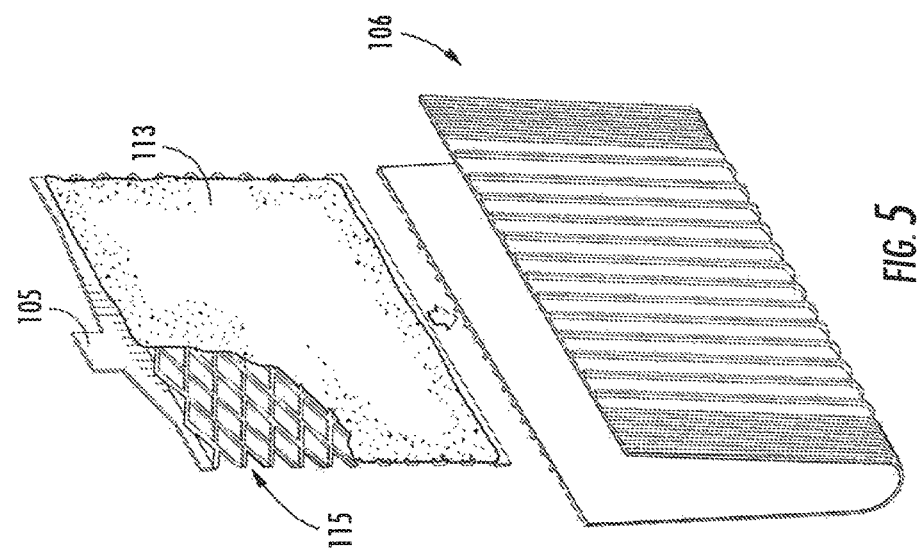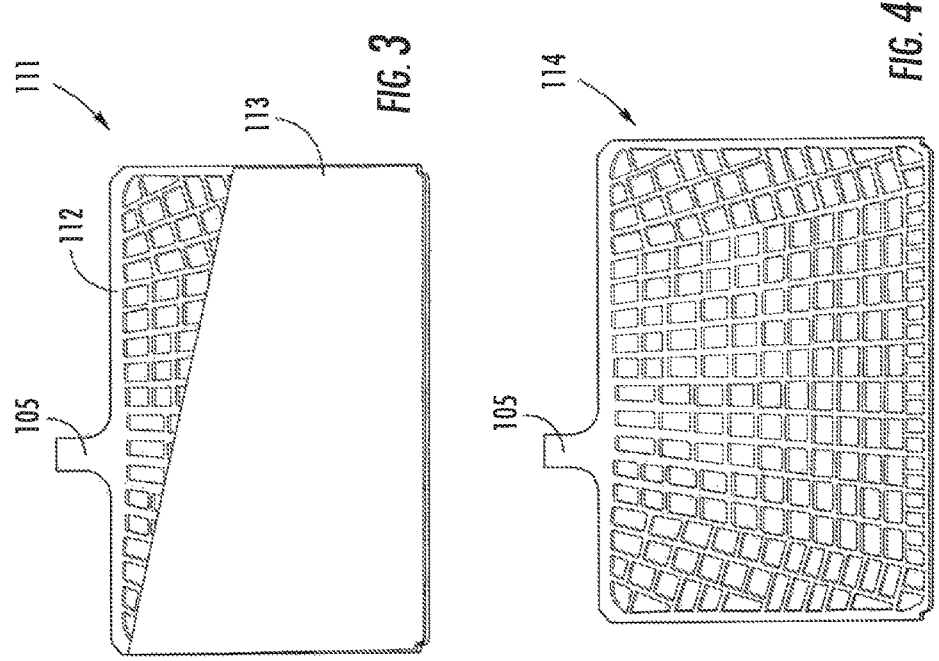

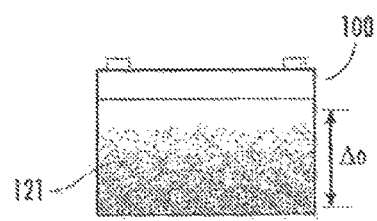
FIG. 6
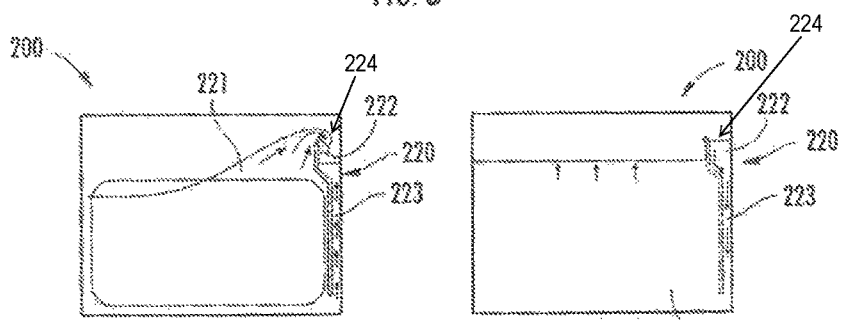
FIG. 7A  FIG. 7B
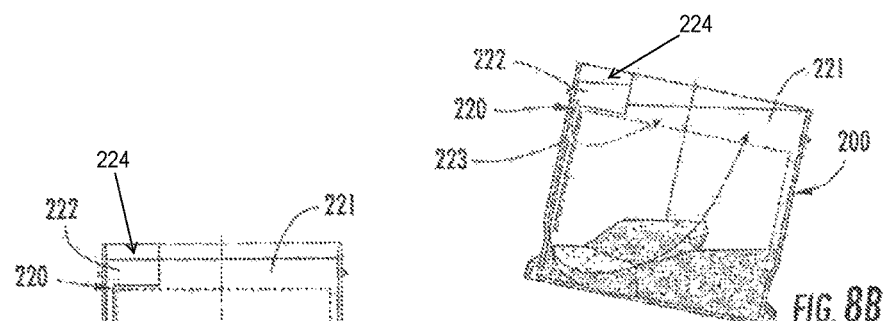
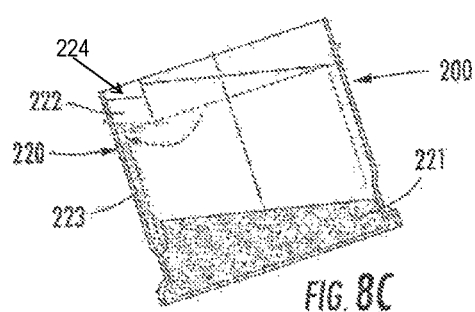
FIG. 8A  FIG. 8B  FIG. 8C

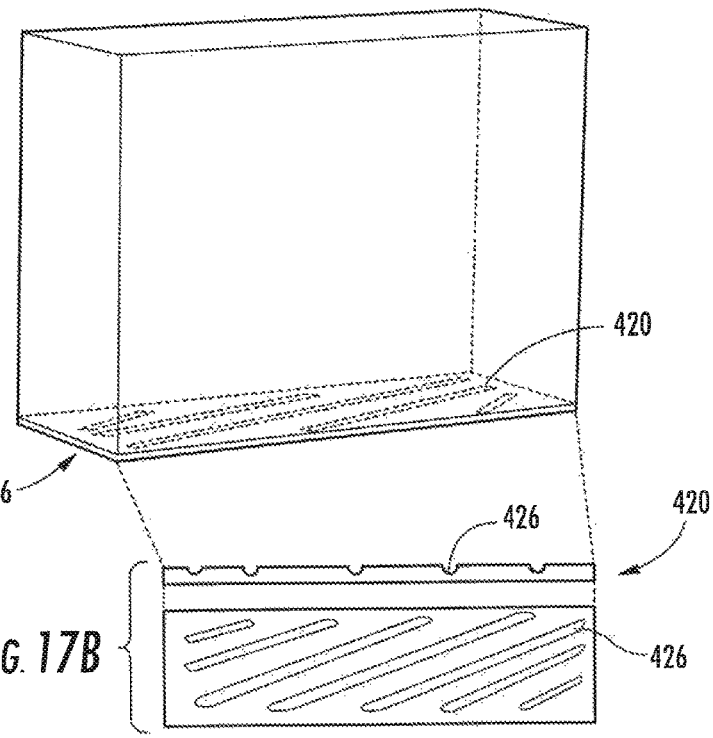
FIG. 17A
FIG. 17B
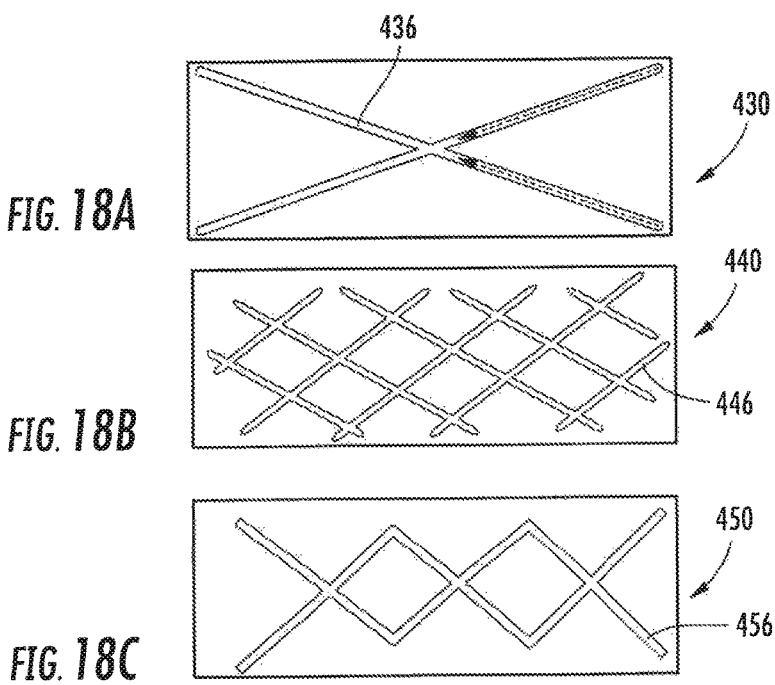
FIG. 18A
FIG. 18B
FIG. 18C

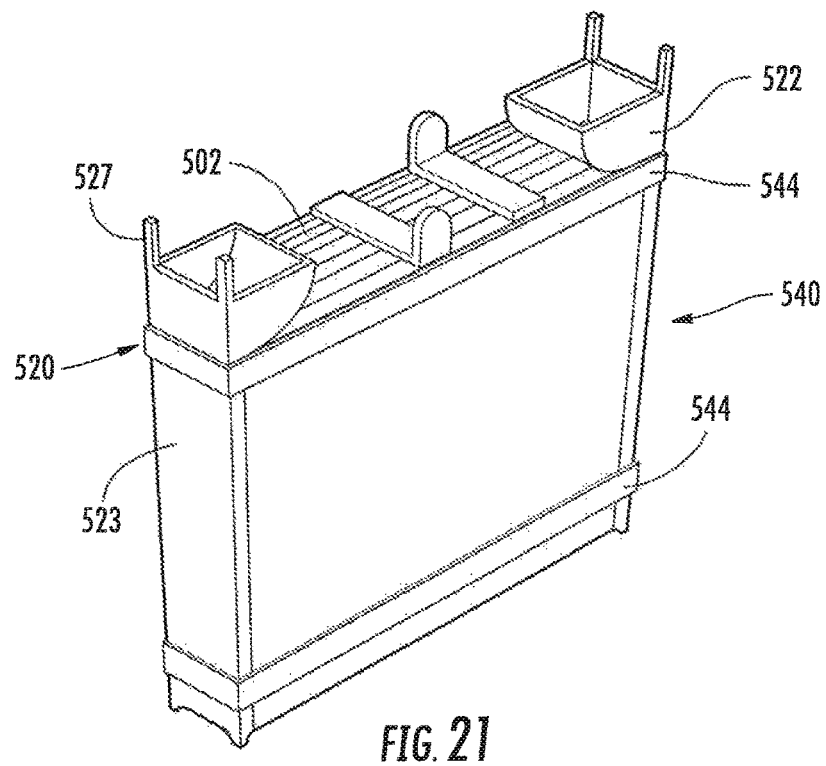
FIG. 21
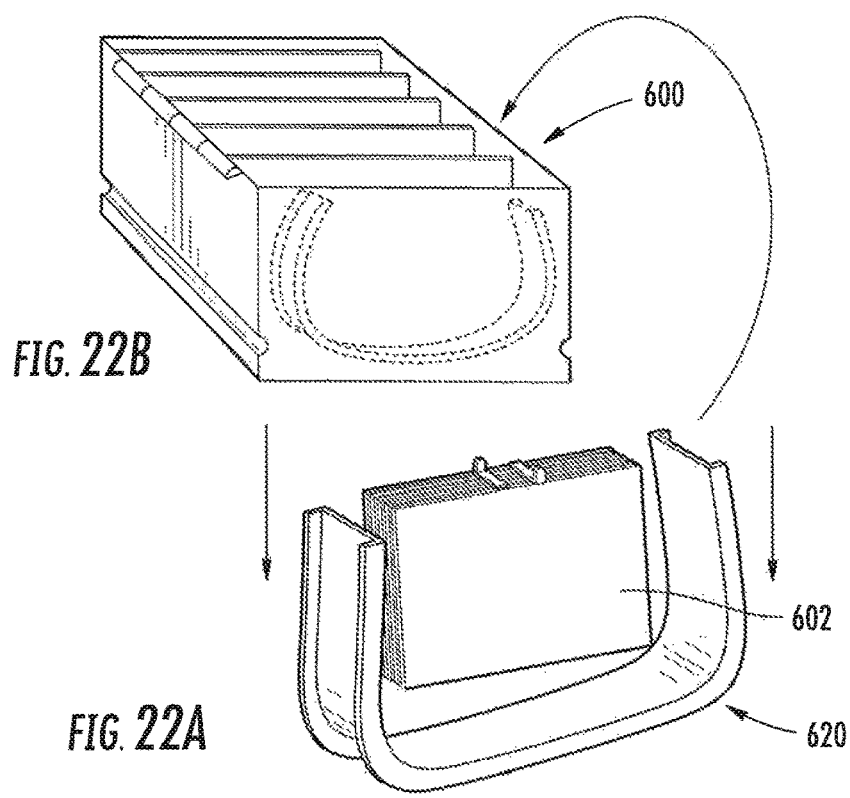
FIG. 22B
FIG. 22A

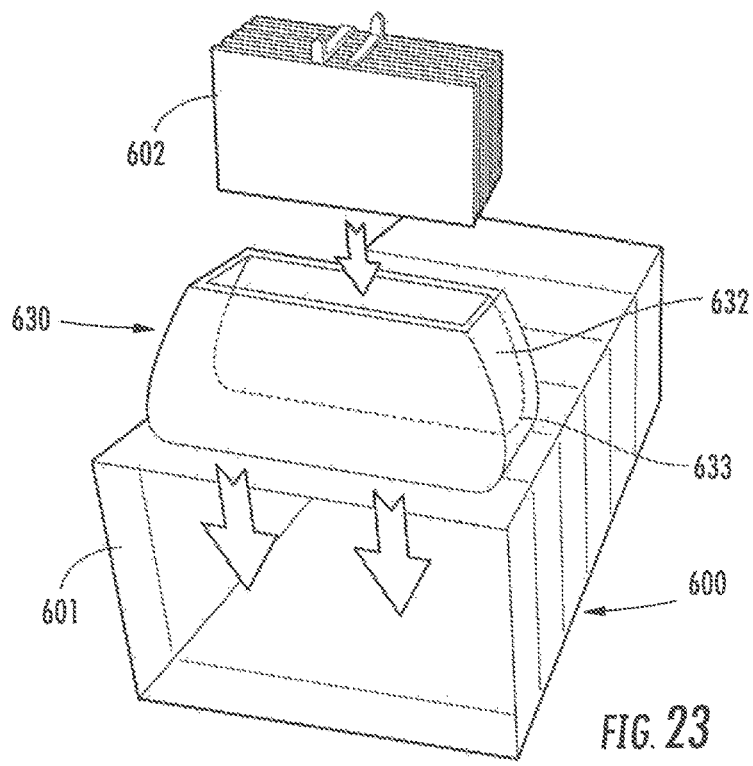
FIG. 23
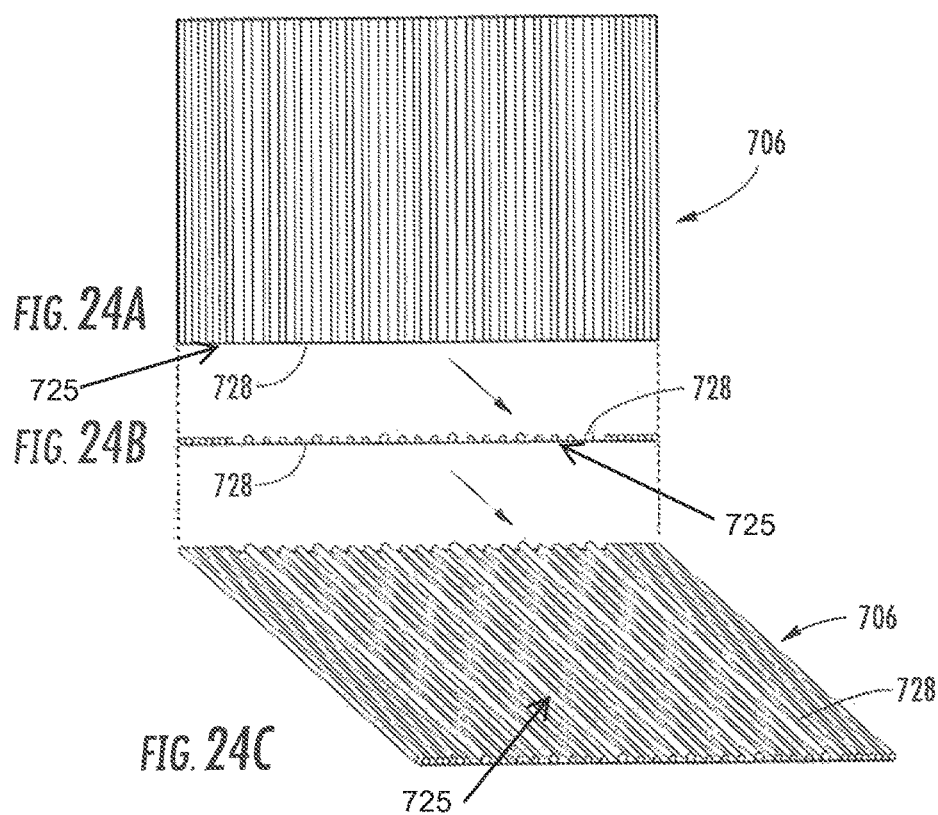
FIG. 24A
FIG. 24B
FIG. 24C

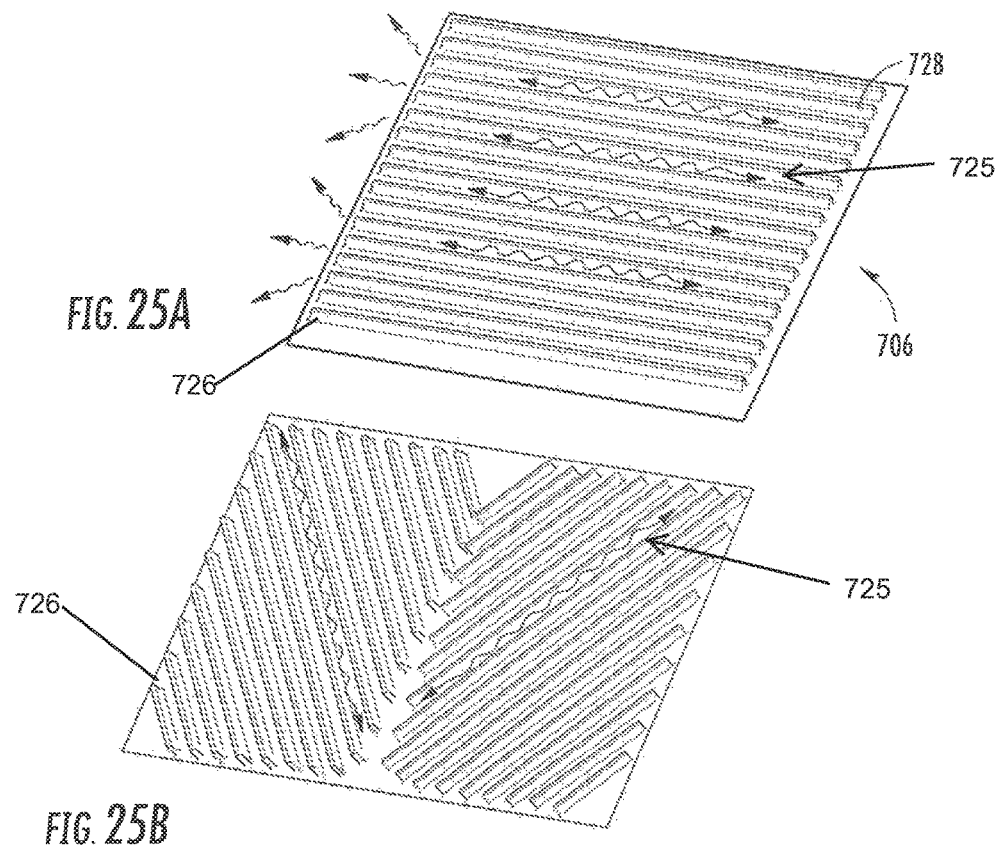
FIG. 25A
FIG. 25B
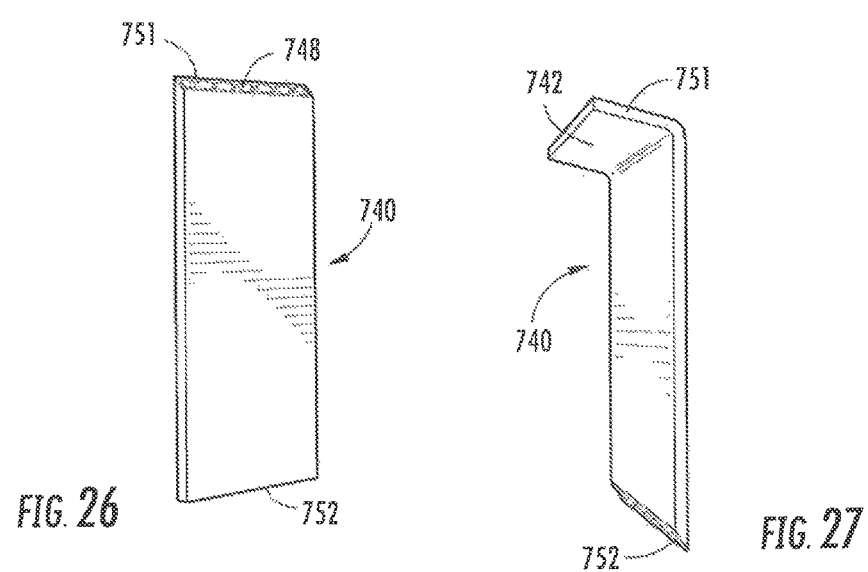
FIG. 26
FIG. 27

SECONDARY BATTERY WITH IMPROVED DESTRATIFICATION

PRIORITY

This application claims priority to U.S. Provisional Application 61/239,979 filed Sep. 4, 2009, and international Application PCT/US2010/047869 filed Sep. 3, 2010, which are incorporated herein by reference in their entirety.

BACKGROUND

1. Field of the Invention

The present inventions relate to the field of batteries (e.g., lead-acid batteries including batteries for vehicle starting, lighting, and ignition applications; marine batteries; commercial batteries; industrial batteries; batteries for use with hybrid-electric vehicles, microhybrid vehicles, etc.). The present inventions more specifically relate to secondary batteries with improved acid destratification.

2. Related Art

It is known to provide for a secondary battery that may include a number of lead plates submersed in an aqueous electrolyte. It is also known that the aqueous electrolyte may become stratified. That is, the acid may separate or develop into regions of higher density and regions of lower density. Such known secondary batteries do not realize certain advantageous features and/or combinations of features.

OUTLINE OF BASIC AND OTHER ADVANTAGEOUS FEATURES

It would be desirable to provide a lead-acid or the like of a type disclosed in the present application that includes any one or more of these or other advantageous features:

1. A secondary battery that demonstrates a reduced tendency for acid stratification;
2. A secondary battery that demonstrates improved acid destratification;
3. A secondary battery having reduced costs associated with its manufacture and materials;
4. A secondary battery that does not require manual insertion of acid pumps;
5. A secondary battery that can be manufactured using high speed manufacturing equipment and/or conventional manufacturing equipment;
6. An acid pump that does not interfere with a seal between a cover and a housing of the secondary battery;
7. An acid pump that can be manufactured at or near the same time and/or using the same equipment as a housing of the secondary battery;
8. An acid pump that is easy to install and/or may be installed without being damaged and/or without causing damage to other components of the secondary battery;
9. An acid pump that does not interfere with a heat seal operation during the manufacture of the secondary battery; and
10. An acid pump that helps prevent and/or reduce stratification of an electrolyte of the secondary battery.

SUMMARY

An exemplary embodiment relates to a lead-acid battery comprising a battery housing comprising a base, side walls and at least one cell wall; one or more battery elements comprising at least one positive plate, at least one negative plate, and a separator positioned between each positive plate and negative plate; an acid pump structure comprising a base with a bottom surface comprising one or more ridges and/or trenches and at least one acid pump attached to the bottom surface; and one or more straps or bands wherein the bottom surface of the acid pump structure is located below and approximately adjacent to a lower edge of one or more battery elements and wherein the at least one acid pump is located approximately adjacent to a side edge of one or more battery elements and wherein the one or more straps bind the one or more battery elements and the acid pump structure together.

Another exemplary embodiment relates to a lead-acid battery comprising a battery housing comprising a base, side walls, and at least one cell wall; one or more battery elements comprising at least one positive plate, at least one negative plate, and a separator positioned between each positive plate and negative plate; and an acid pump comprising a generally U-shaped structure wherein one or more battery elements are at least partially contained within the acid pump.

Another exemplary embodiment relates to a lead-acid battery comprising a battery housing comprising a base, side walls, at least one cell wall forming at least two or more battery cells, and a cover; one or more battery elements comprising at least one positive plate, at least one negative plate, and a separator positioned between each positive plate and negative plate; and an acid pump wherein the one or more battery elements are configured such that the battery cells include vacant space not occupied by the battery cell element and wherein at least a portion of the vacant space is occupied by the acid pump and wherein at least a portion of the acid pump is an integral part of or attached to the battery housing.

Another exemplary embodiment relates to a method of manufacturing a lead-acid battery comprising providing a battery housing comprising a base and side walls; providing one or more battery cells comprising at least one positive plate, at least one negative plate, and a separator positioned between each positive plate and negative plate; forming a battery cell assembly by at least partially enclosing a battery cell in an acid pump structure comprising a base with a bottom surface comprising one or more ridges and/or trenches and at least one acid pump attached to the bottom surface; and securing the battery cell assembly with one or more straps or bands.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein:

FIG. 1 is an isometric view of a vehicle including a battery according to an exemplary embodiment;

FIG. 2 is an isometric cut-away view of a portion of a battery according to an exemplary embodiment;

FIG. 3 is a front plan cut-away view of a portion of a battery plate or electrode (e.g., positive battery plate) comprising a stamped grid and active material according to an exemplary embodiment;

FIG. 4 is a front plan view of a stamped grid (e.g., positive grid) according to an exemplary embodiment;

FIG. 5 is an isometric cut-away view of a battery plate or electrode (e.g., negative battery plate) and separator according to an exemplary embodiment;

FIG. 6 is a schematic representation of the acid density of a lead acid battery exhibiting acid stratification;

FIGS. 7A and 7B are a series of side cross-section views of a secondary battery and an acid pump according to an exemplary embodiment;

FIGS. 8A, 8B, and 8C are a series of side cross-section views of a secondary battery and an acid pump according to an exemplary embodiment;

FIGS. 17A and 17B show isometric, top plan and side cross-section views of a secondary battery compartment according to an exemplary embodiments;

FIGS. 18A, 18B, and 18C shows top plan views of other exemplary embodiments of the secondary battery compartment shown in FIG. 12;

FIGS. 20A, 20B, and 21 are isometric views of an element, compartment and a secondary battery acid pump according to various exemplary embodiments;

FIGS. 22A and 22B is an isometric view of a secondary battery housing, element and acid pump according to an exemplary embodiment;

FIG. 23 is an isometric view of a secondary battery housing, element and acid pump according to an exemplary embodiment;

FIGS. 24A, 24B, 24C, 25A, and 25B are a series of views and a partial view of a separator according to various exemplary embodiments;

FIGS. 26 and 27 are perspective views of corrugated channels usable as acid pumps and/or separator according to various exemplary embodiments;

Figure 9:
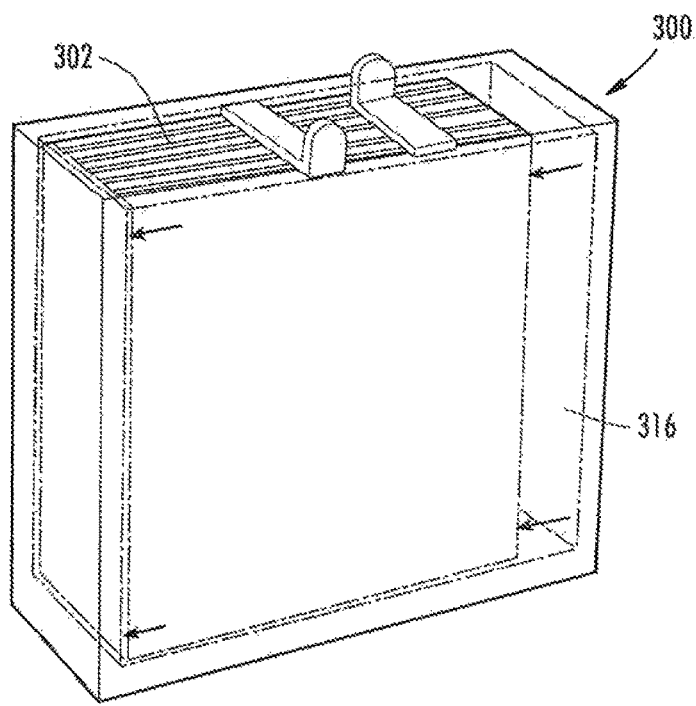
FIG. 9 is an isometric and top plan view of a compartment of a secondary battery according to an exemplary embodiment.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

BRIEF OUTLINE OF CERTAIN ELEMENTS AND ASSEMBLIES

I. Vehicle

Referring to FIG. 1, a vehicle 90 is shown that includes a battery 100 according to an exemplary embodiment. While the vehicle 90 is shown as an automobile, according to various alternative embodiments, the vehicle may comprise any variety of types of vehicles including, among others, motorcycles, buses, recreational vehicles, boats, and the like. According to an exemplary embodiment, the vehicle uses an internal combustion engine for locomotive purposes.

II. Battery

The battery 100 shown in FIG. 1 is configured to provide at least a portion of the power required to start or operate the vehicle and/or various vehicle systems (e.g., starting, lighting, and ignition systems). Further, it should be understood that the battery 100 may be utilized in a variety of applications not involving a vehicle, and all such applications are intended to be within the scope of the present disclosure.

The battery 100 shown in FIG. 1 may include any type of secondary battery (e.g., rechargeable battery). According to an exemplary embodiment, the battery includes a lead-acid storage battery. Various embodiments of lead-acid storage batteries may be either sealed (e.g., absorbent glass mat) or unsealed (e.g., wet). According to an exemplary embodiment, the lead-acid storage battery is an unsealed lead-acid battery and periodically requires the addition of electrolyte and/or water to maintain a desired volume and/or concentration of either or both.

A lead-acid storage battery 100 according to an exemplary embodiment is illustrated in FIG. 2. In various embodiments, the lead-acid storage battery 100 includes several cell elements which are provided in separate compartments of a container or housing containing electrolyte. The illustrations provided herein relate to automotive applications, wherein groups of 12-16 plates are used in each of six stacks for producing a standard automotive 12-volt battery. It will be obvious to those skilled in the art after reading this specification that the size and number of the individual grids, the size and number of plates in any particular stack, and the number of stacks used to construct the battery may vary widely depending upon the desired end use.

A. Housing

In various embodiments, the battery housing 101 includes a box-like base or container and is made of a moldable resin. A plurality of plate blocks 102 are connected in series according to the capacity of the lead storage battery 100 and are accommodated in the battery container or housing 101 together with the electrolyte, which is most commonly aqueous sulfuric acid.

In various embodiments, the battery includes a compartment having a front wall, end walls, a rear wall and a bottom wall. In various embodiments, five cell partitions or dividers are provided between the end walls, resulting in the formation of six compartments, as typically would be present in a twelve volt automotive battery. In various embodiments, a plate block 102 is located in each compartment, each plate block 102 including one or more positive and negative plates 103 and 104, each having at least one lug 105, and separator material 106 placed between each positive and negative plate 103 and 104.

B. Cover/Venting

A cover 107 is provided for the housing 101, and in various embodiments, the cover 107 includes terminal bushings and fill tubes to allow electrolyte to be added to the cells and to permit servicing. To prevent undesirable spillage of electrolyte from the fill tubes, and to permit exhausting of gases generated during the electrochemical reaction, a battery may also include one or more filler hole caps and/or vent cap assemblies.

1. Terminals/Cast-On-Strap

At least one positive and negative terminal post 108 and 109 may be found on or about the top or front compartments of the battery. Such terminal posts 108 and 109 typically include portions which may extend through the cover and/or the front of the battery housing, depending upon the battery design. In various embodiments, the terminal posts 108 and 109 also extend through a terminal post seal assembly to help prevent leakage of acid. It will be recognized that a variety of terminal arrangements are possible, including top, side or corner configurations known in the art.

FIG. 2 also shows a conventional cast-on-strap 110 which includes a rectangular, elongated body portion of a length sufficient to electrically couple each lug 105 in a plate set 102 and an upwardly extending member having a rounded top. FIG. 2 also illustrates a cast-on-strap coupling lugs 105 to a negative terminal 108. As shown in FIG. 2, according to various embodiments, the strap includes a body portion coupling the respective lugs 105 in the end compartments and a post 108 or 109 formed therewith to protrude through a cover.

C. Elements

Each cell element or chapter includes at least one positive plate 103, at least one negative plate 104, and a separator 106 positioned between each positive and negative plate 103 and 104. Separators 106 are provided between the plates to prevent shorting and undesirable electron flow produced during the reaction occurring in the battery.

1. Plates

Positive and negative electrode plates can be classified into various types according to the method of manufacturing the same. As one example, a paste type electrode 111 is shown in FIGS. 3-5. In various embodiments, the paste type electrode 111 includes a grid substrate 112 and an electrochemically active material or "paste" 113 provided on the substrate. The grid substrate 112 may be formed of a lead alloy containing a trace of other materials (e.g., calcium) for enhancing the mechanical strength of the substrate.

a. Grids

Referring to FIGS. 3-5, the positive and negative plates 103 and 104 each comprise a lead or lead alloy grid 112 that supports an electrochemically active material 113. The grids 112 provide an electrical contact between the positive and negative active materials or paste 113 which serves to conduct current. The grids 112 also serve as a substrate for helping support electrochemically active material (e.g., paste) 113 deposited or otherwise provided thereon during manufacture to form battery plates 103 and 104.

As set forth in greater detail below, known arts of lead acid battery grid making include: (1) batch processes such as book mold gravity casting; and (2) continuous processes such as strip expansion, strip stamping, continuous casting, and continuous casting followed by rolling. Grids made from these processes tend to have unique features characteristic of the particular process and behave differently in lead acid batteries, especially with respect to the pasting process. It should be appreciated that grids formed from any conventional or later-developed grid manufacturing process may be utilized, and it is not the intent to limit the invention to the grid design disclosed herein.

In various embodiments, at least some of the grids are stamped grids. FIG. 3 illustrates an exemplary embodiment of a stamped grid 114 (e.g., a grid for a positive plate) with active material or paste 113 provided thereon. FIG. 4 illustrates the stamped grid 114 shown in FIG. 3, but without active material. In various embodiments, the stamped grid 114 includes a frame that includes a top frame element, first and second side frame elements, and a bottom frame element. In various embodiments, the stamped grid 114 includes a series of grid wires that define open areas that help hold the active material or paste that helps provides current generation. In various embodiments, a current collection lug 105 is integral with the top frame element. While FIGS. 3-4 depict the lug 105 as offset from the center of the top frame element, the lug may alternatively be centered or positioned closer to either the first or second side frame elements. The top frame element may include an enlarged conductive section at least a portion of which is directly beneath the lug 105 to optimize current conduction to the lug 105.

The bottom frame element may be formed with one or more downwardly extending feet (not shown) for spacing the remainder of the grid away from the bottom of the battery container, in various embodiments, at least some of the wires increase in cross-sectional area along their length from bottom to top or have a tapered shape so as to optimize the current carrying capacity of the wires to help carry away increasing current being generated from the bottom to the top. The width and spacing of the wires between side elements may be predetermined so that there are substantially equal potential points across the width of the grid. To assist in supporting the electrochemical paste and/or permit the formation of paste pellets, in various embodiments, the stamped grid also includes horizontal wires which are equally spaced apart and are parallel to the top and/or bottom frame elements. As shown in FIG. 3-4, however, at least some of the horizontal wires may not be equally spread apart or parallel to the top and/or bottom frame elements.

Various stamped grid designs may be utilized (see, e.g., U.S. Pat. Nos. 5,582,936; 5,989,749; 6,203,948; 6,274,274; 6,921,611; and 6,953,641 and U.S. patent application Ser. Nos. 10/996,168; 11,086,525; 10,819,489; and 60/904,404, each of which are incorporated herein by reference in their entireties). It should be noted that an infinite number of grid designs may be utilized and therefore, it is not the intent of the following description to limit the invention to the grid design shown in FIGS. 3-5, which are presented for the purposes of illustration.

An exemplary embodiment of an expanded metal grid 115 (e.g., a grid for the negative plate) is illustrated in FIG. 5. In various embodiments, the expanded metal grid 115 has a pattern (e.g., a diamond pattern such as that shown in FIG. 5), which is well known in the art, with a bottom frame element, and a top frame element that is integral with a lug.

Referring to FIGS. 3-5, the cross-section of the grid wires may vary depending upon the grid making process. To help improve adhesion of the battery paste, however, in various embodiments, the grid wires may be mechanically reshaped or refinished. It should be appreciated that any number of grid wire shapes may be utilized as long as the shape provides suitable paste adhesion characteristics. For example, the cross section of wires may be of any cross-section design including substantially oval shaped, substantially rectangular, substantially diamond shape, substantially rhomboid shape, substantially hexagon shape, and/or substantially octagon shape. In the battery grid, each grid wire section may have a different cross-sectional configuration, or each grid wire section may have the same or a similar cross-sectional configuration. However, it is preferred that each grid wire section have the same cross-sectional configuration. Depending on the needs, a grid can be deformed at the vertical wire elements only, the horizontal wire elements only, or at both the vertical and horizontal wire elements.

b. Active Material/Paste

The active material or paste is typically a lead-based material (e.g., $PbO$, $PbO_2$, $Pb$, or $PbSO_4$ at different charge/discharge stages of the battery) that is pasted, deposited or otherwise provided onto the grids. The paste composition may be determined by power requirements, cost, and battery environment, as it is known in the art. In various embodiments, the active material of a lead-acid battery is prepared by mixing lead oxide, sulfuric acid, and water. The lead oxide reacts with the sulfuric acid to form mono-, tri- and/or tetrabasic lead sulfate(s). Dry additives, such as fiber and expander, may also be added to the active material. For example, in various embodiments, expanders such as finely-divided carbons (e.g., lampblack or carbon black), barium sulfate, and various lignins may be included in the active material. In various embodiments, the mixture is then dried and water is re-added to form a paste of the desired consistency.

The active material provided on the positive grid (e.g., lead dioxide [$PbO_2$]), is typically in micro-particle form, so that the electrolyte is allowed to diffuse and permeate through the lead dioxide microparticles on the positive electrode plate. The spongy lead, the active material of the negative electrode plate, is typically porous and reactive, so that the electrolyte is allowed to diffuse and permeate through the sponge lead on the negative electrode plate.

c. Pasting Material

To prevent the separation of the active materials from the grids and to ensure easy handling of the active materials in the manufacture of electrodes, a pasting paper (not shown) may be adhered or otherwise provided on at least one of the surfaces of the active material as a support to the active material after deposition on the grids. Porous nonwoven fabric (e.g., having micron-sized pores), instead of paper, may alternatively be provided into the surface or on the active material to prevent the separation and handling problems of the active material and initial high rate discharge degradation. For example, a nonwoven fabric synthesized from thermoplastic resin by spun-bonding or thermal-bonding may be used. In various embodiments, nonwoven fabric formed of one or more polyesters, polypropylenes, or viscose rayon is used.

2. Separators

In various embodiments, one or more battery separators 106 are used to conductively separate the positive and negative electrodes. The separator material 106 is typically microporous to allow the through passage of ions from the positive and negative electrodes. Separators 106 for automotive batteries are typically made in continuous lengths and rolled, subsequently folded as shown in FIG. 5, and sealed along one or more of their edges to form pouches that receive a battery plate (e.g., a negative plate 104 as shown in FIG. 5 or a positive plate as shown in FIG. 2).

In various embodiments, separator material generally has a substantially uniform thickness and a substantially uniform pore distribution. The pore distribution helps ensure an overall uniform current density during operation, thereby helping achieving a uniform charging and discharging of the electrodes and maximum battery efficiency. A separator generally incorporates one or more ribs (e.g., as shown in FIG. 5) to help stiffen the separator.

The separator material may be constructed of a variety of materials polyolefin, rubber, phenol-formaldehyde resorcinol, glass mat, microporous PVC, and sintered PVC). In various embodiments, the separator is comprised of a microporous sheet comprised of high molecular weight polyolefin. Examples of polyolefins that may be used include polyethylene, polypropylene, polybutene, ethylene-propylene copolymers, ethylene-butene copolymers, propylene-butene copolymers, and ethylene-propylene-butene copolymers.

In various embodiments, the separator is also constructed of an inert filler material. The filler can be soluble or insoluble in water. However, the filler may provide the primary means by which any plasticizer is absorbed and held in the composition and should not be soluble in the plasticizer. The preferred filler is dry, finely divided silica. However, other fillers (e.g., carbon black, coal dust, graphite, metal oxides and hydroxides, metal carbonates, minerals, zeolites, precipitated metal silicates, alumina silica gels, wood flour, wood fibers and bark products, glass particles, salts such as barium sulfate, inorganic salts, acetates, sulfates, phosphates, nitrates, carbonates, and/or combinations thereof) may be utilized. It should also be understood that any known or later-developed wetting agents (e.g., sodium alkyl benzene sulfonate, sodium lauryl sulfate, dioctyl sodium sulfosuccinate, and isoctyl phenyl polyethoxy ethanol) may be utilized to enhance the wettability of the filler.

In various embodiments, a separator also includes at least one plasticizer. The plasticizer may be soluble or insoluble in water. Examples of plasticizers that may be used include organic esters, epoxy compounds, phosphate esters, hydrocarbon materials, and low molecular weight polymers.

In various embodiments, the separator is comprised of a stabilizer or an antioxidant. In various embodiments, conventional stabilizers or antioxidants such as 4,4 thiobis(6-tert-butyl-m-cresol) ("Santonox") and 2,6-di-tert-butyl-4-methylphenol ("Ionol") may be utilized.

When the separator is provided with one or more ribs, the ribs may be formed from a number of known or later-developed polymeric compositions (e.g., the same composition as the separator, other polyolefins, polyvinyl chloride, and/or filled or foamed compositions thereof). The ribs may be provided in any number of ways. For example, the ribs may be formed by extrusion (either unitarily with the sheet or separately). The ribs may also be formed by grooving or embossing. When ribs are molded separately, they may be bonded or otherwise coupled to the sheet or base web by any number of methods known in the art including heat sealing or by an adhesive.

While a particular rib configuration is shown in FIG. 5, one skilled in the art will appreciate that any variety of rib configuration may be utilized depending at least in part on the grid design, plate design and/or battery.

The thickness of a separator will vary depending upon the type of battery in which it is used. In general, the thickness of the base web can range from 1 to 50 mils. For lead-acid batteries, the preferred thickness range is typically 10 to 40 mils. The height of each rib may vary over a wide range depending upon plate spacing requirements. Generally, ribs from 5 to 200 mils in height from the base are provided, with the preferred range being 10 to 100 mils.

D. Acid

As outlined above, in various embodiments, aqueous sulfuric acid is utilized as an electrolyte in a secondary battery. Aqueous sulfuric acid interacts with electrode plates submerged in the sulfuric acid during charging and discharging.

Acid stratification generally refers to the separation or striation of the aqueous electrolyte of a secondary battery into regions of higher density and regions of lower density, at least relative to each other. For example, in a lead acid battery utilizing aqueous sulfuric acid as an electrolyte, over time, the aqueous sulfuric acid may become distributed unevenly or concentrated and diluted in various regions such that the aqueous sulfuric acid near the bottom of the battery has a higher density than the aqueous sulfuric acid near the top of the battery. FIG. 6 depicts a secondary battery 100 demonstrating acid stratification. The relatively more dense aqueous electrolyte 121 is depicted in the darker regions toward the bottom of the secondary battery and the relatively less dense aqueous electrolyte 121 is depicted in the lighter regions toward the top of the secondary battery 100. A secondary battery 100 that demonstrates acid stratification may have a distinct separation between neighboring regions of different electrolyte densities or, as shown in FIG. 6, may exhibit a more gradual change from a point of low electrolyte density (e.g., near the top of the secondary battery) to a point of high electrolyte density (e.g., near the bottom of the secondary battery).

There may be various causes of acid stratification. For example, the uneven current density across various regions of the plurality of electrode plates may cause the electrolyte to experience chemical reactions at uneven levels, resulting in acid stratification. Additionally, the recharge cycle of exemplary deep discharge batteries may be particularly prone to conditions that result in acid stratification.

Likewise, there may be various effects of acid stratification. In various exemplary embodiments, a secondary battery that demonstrates acid stratification may experience increased corrosion of electrode plates in the regions of higher electrolyte, density. An increase in electrode plate corrosion may reduce the cycle life of the battery (e.g., the number of successful charge/discharge cycles before the battery fails). Additionally, in regions of low electrolyte density, the secondary battery may suffer from electrolyte starvation. That is, the regions of low electrolyte density may not have the necessary chemical components for proper and/or efficient operation of the battery.

E. Acid Pumps

An acid pump can refer to a passive or active device, feature or component that desirably causes, controls, and/or directs movement within the aqueous electrolyte of a secondary battery. Alternatively, an acid pump can refer to a passive or active device, feature or component that desirably inhibits movement of the aqueous electrolyte of the secondary battery, at least in one direction, to help prevent settling of the aqueous electrolyte. For example, an acid pump may desirably prevent gravitational separation of the aqueous electrolyte by inhibiting the settling of denser electrolyte that might otherwise move toward the bottom of the battery. As such, the acid pump may help partially inhibit or prevent the stratification of the aqueous acid, rather than help to reduce the stratification after it occurs. In various embodiments, an acid pump may be any structure, device, feature, or component that helps cause the aqueous electrolyte to move in any direction that is not conducive to the electrolyte settling into regions of differing density and/or that prevents the aqueous electrolyte from moving in a direction that is conducive to the electrolyte settling into regions of differing densities.

In various embodiments, a secondary battery utilizes one or more passive acid pumps to help impart motion in the aqueous electrolyte of the secondary battery. The imparted motion generated, at least in part, by the one or more acid pumps helps facilitate an interaction between regions of high density and regions of low density within the aqueous electrolyte. This interaction helps equalize the densities of the various regions such that the aqueous electrolyte has a more uniform density distribution.

1. Passive Destratification

Referring to FIGS. 7A to 8C, in various embodiments, a passive acid pump 220 includes a head tank 222 and a throat 223. The head tank 222 includes a mouth or opening 224 on or near its top region or surface, which is typically positioned above a resting level of the aqueous electrolyte. During normal operation of the secondary battery, the battery 200 may be moved, causing a corresponding movement of the aqueous electrolyte 221 within the battery 200. Particular types of movement, such as, for example, abrupt changes in direction and/or velocity, may help form waves in the aqueous electrolyte 221. As these waves approach the acid pump 220, in various embodiments, at least a portion of the aqueous electrolyte 221 spills into the head tank 222 through the mouth 224 of the acid pump 220. As aqueous electrolyte 221 enters the head tank 222, it is pulled toward and into the throat 223 of the acid pump 220 by gravity. The aqueous electrolyte 221 moving through the throat 223 of the acid pump 220 helps force aqueous electrolyte 221 out through the bottom of the throat 223, thereby mixing at least some of the electrolyte 221. Additionally, in various embodiments, the throat 223 is narrower than the head tank 222 and/or the throat 223 includes structures that prevent or discourage aqueous electrolyte from flowing up the throat 223 toward the head tank 222. Aqueous electrolyte flowing from the throat into the head tank may prevent the entry and/or collection of aqueous electrolyte in the head tank and thus the imparted movement down through the throat.

2. Active Destratification

In various embodiments, a secondary battery utilizes one or more active acid pumps to help impart motion in the aqueous electrolyte of the secondary battery. The active pumps typically use energy from an outside source to help generate the motion in the aqueous electrolyte. As with the passive acid pumps, the imparted motion generated, at least in part, by the one or more acid pumps helps facilitate an interaction between regions of high density and regions of low density within the aqueous electrolyte. This interaction helps equalize the densities of the various regions such that the aqueous electrolyte has a more uniform density distribution.

It should be appreciated that an acid pump may help cause the aqueous electrolyte to equalize in density through various movements of the electrolyte. For example, the movement of the electrolyte may cause turbulence that helps stir the electrolyte. Alternatively, electrolyte from the top of the secondary battery may be moved toward the bottom of the secondary battery and/or electrolyte from the bottom of the secondary battery may be moved toward the top of the secondary battery, thereby mixing at least some of the electrolyte.

Basic Operation

In various exemplary embodiments, a secondary battery 300 includes one or more acid pumps. Referring to FIG. 9, a portion of an exemplary secondary battery 300 is shown in an isometric view and a top plan view. As outlined above, the battery 300 includes one or more elements 302, which each include one or more positive electrode plates, one or more negative electrode plates, and a separator between any neighboring positive and negative electrode plates. In the exemplary embodiment shown in FIG. 9, one or more of the elements 302 are offset, moved or shifted toward an off-center position (e.g., toward a first side of the secondary battery) to create more or consolidate space 316 in one or more locations of the secondary battery 300 (e.g., near a second side of the secondary battery opposing the first side). The space 316 may be usable to provide at least a portion of an acid pump. It should be appreciated that the arrangement shown in FIG. 9 may be used with any other desired acid pump to, for example, provide space for the acid pump or make it easier to insert the acid pump into the battery housing.

Figures 10, 11:
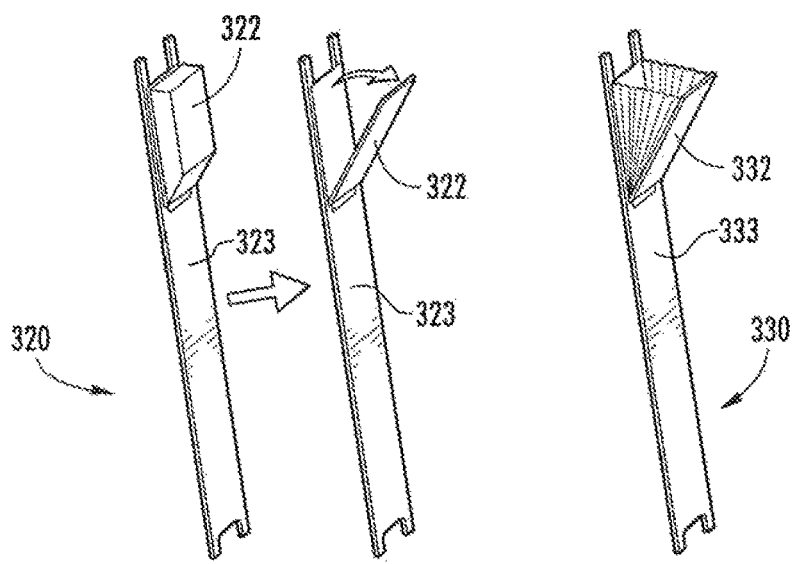
FIG. 10 is a series of isometric views of an acid pump according to an exemplary embodiment.
FIG. 11 is an isometric view of an acid pump according to an exemplary embodiment.
Figure 12:
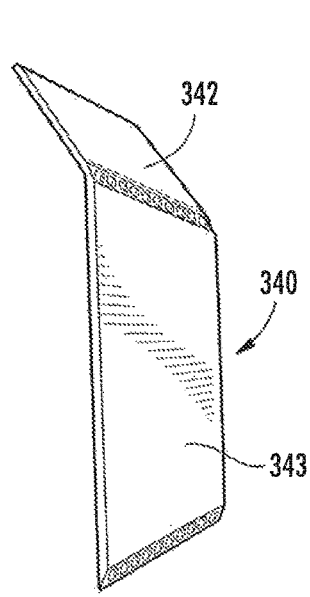
FIG. 12 is an isometric view of an acid pump according to an exemplary embodiment.
Figure 13:
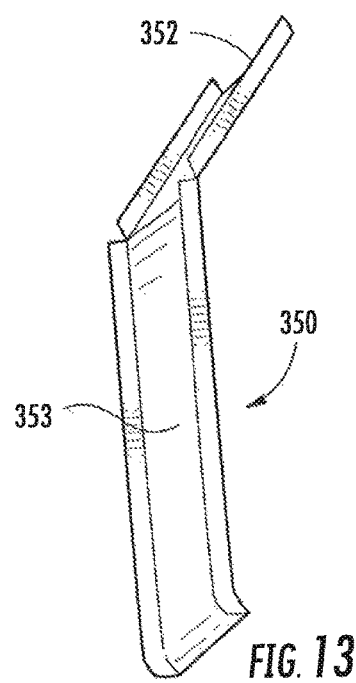
FIG. 13 is an isometric view of an acid pump according to an exemplary embodiment.
Figure 14:
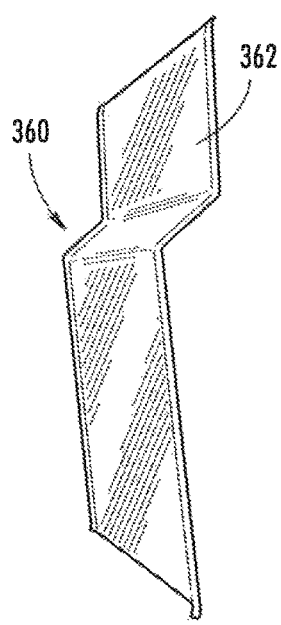
FIG. 14 is an isometric view of an acid pump according to an exemplary embodiment.

FIGS. 10-14 show various exemplary embodiments of an acid pump that can be provided in the space shown in FIG. 9. In various embodiments, the acid pumps shown in FIGS. 10-14 can be placed in other areas (e.g., in opposing ones of compartments) without consolidating or creating space as shown in FIG. 9. As shown in FIG. 10, the acid pump 320 may be a structure separate from the secondary battery, its housing, and cover. As outlined above, the acid pump 320 may include a head tank or reservoir 322 and a throat 323. In the embodiments shown in FIGS. 10-14, the head tank or reservoir 322, 332, 342, 352, or 362 is foldable or collapsible against the rest of the acid pump 320, 330, 340, 350, or 360 and or in relation to the rest of the acid pump 320, 330, 340, 350, or 360 allowing the acid pumps to be installed in a collapsed state and later expanded or allowed to expand. As such, the acid pumps 320, 330, 340, 350, and 360 shown in FIGS. 10-14 may be particularly easy to install into a secondary battery without damaging the acid pump and/or other components of the secondary battery, or otherwise hindering conventional battery manufacturing processes. In various exemplary embodiments, the acid pump utilizes one or more internal structures of the battery to help provide the acid pump structure. For example, as shown in FIGS. 10, and 12-14, in various exemplary embodiments, the acid pump includes a head tank 320, 340, and 350 and/or throat 323, 343, and 353 that does not include side walls. In such exemplary embodiments, internal structures of the battery (e.g., a cell wall partition) may help provide the side walls of the head tank 322, 342, and 352 and/or throat 323, 343, and 353 of the acid pump 320, 340, and 350.

Figure 15:
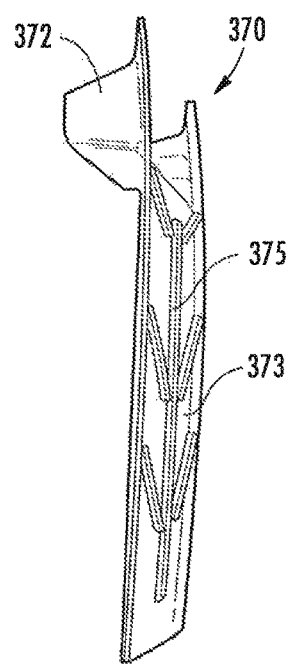
FIG. 15 is an isometric view of an acid pump according to an exemplary embodiment.
Figure 16:
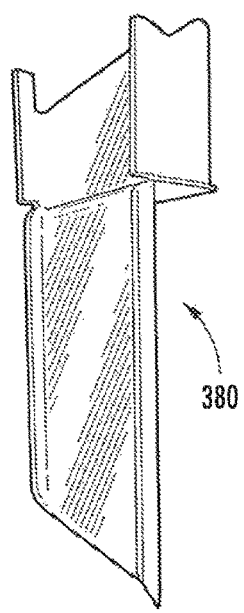
FIG. 16 is an isometric view of an acid pump according to an exemplary embodiment.

FIGS. 15 and 16 show exemplary embodiments of an acid pump 370 and 380 that is provided as a solid structure. In various exemplary embodiments, the acid pumps 370 and 380 shown in FIGS. 15 and 16 may be provided in the space shown in FIG. 9 and/or in other places (e.g., in opposing ones of compartments) without consolidating or creating space as shown in FIG. 9. As shown in FIG. 15, in various exemplary embodiments, the acid pumps 370 may include structures 375 that inhibit, prevent, or discourage fluid flow in an upward direction into or through the throat 373 of the acid pump 370 (e.g., into or through the throat in a direction toward the head tank or reservoir 372), while not substantially inhibiting, preventing, or discourage fluid flow in a downward direction (e.g., from the head tank or reservoir 372 into and/or through the throat 373).

Structures on various surfaces of the secondary battery may be usable to help create or direct flow of aqueous electrolyte, and, for the purposes of this disclosure, will be referred to as acid pumps. It should be appreciated that such structures may be used with any other desired acid pumps to, for example, improve the efficiency and/or effectiveness of the other desired acid pumps. FIGS. 17A to 20B show various embodiments of acid pumps 420, 430, 440, and 450 that utilize one or more structures (e.g., ridges or channels) on a bottom interior surface of the secondary battery to help create or direct flow of aqueous electrolyte. As shown in FIGS. 17A to 18C, one or more ridges and/or trenches 426, 436, 446, and 456 may be provided on a bottom interior surface of the battery (e.g., a bottom surface of the battery housing) to help allow or encourage movement of aqueous electrolyte within the battery (e.g., movement along the bottom interior surface of the battery). As the aqueous electrolyte moves, it desirably causes interactions between regions of aqueous electrolyte having different densities. The interactions between the regions of different densities helps the aqueous electrolyte to mix and provide a more uniform density. As shown in FIGS. 17A and 17B, the ridges and/or trenches 426, 436, 446, and 456 may be formed in roughly parallel lines and may allow or encourage motion in roughly parallel directions. Alternatively, as shown in FIGS. 18A to 18C, the ridges and/or trenches 426, 436, 446, and 456 may be formed in one or more different crossing patterns to allow or encourage motion in intersecting and/or divergent directions.

Figure 19A:
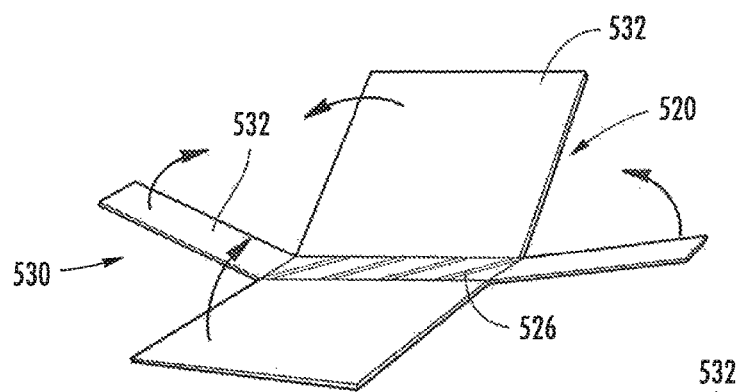
FIGS. 19A and 19B are isometric views of a compartment and a secondary battery acid pump according to an exemplary embodiment.
Figure 19B:
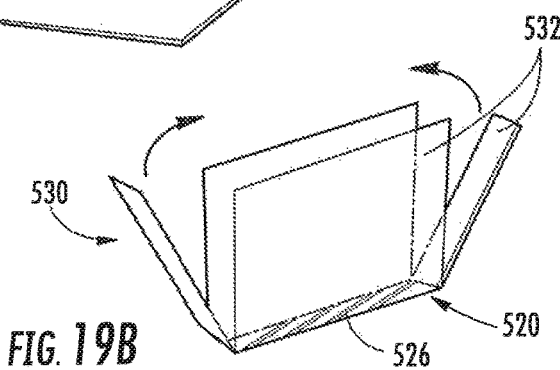

As shown in FIGS. 19A and 19B, in various embodiments, one or more structures 531 (e.g., ridges and/or channels) may be provided on a bottom interior surface of a separate apparatus 530, which may be usable, for example, to help contain one or more elements or cells of a secondary battery. The separate apparatus may include, for example, up to four side walls 532, and a bottom surface 533.

Figure 20A:
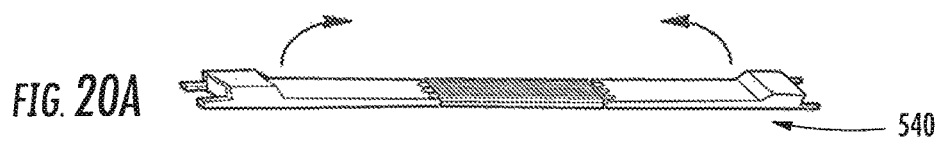
Figure 20B:
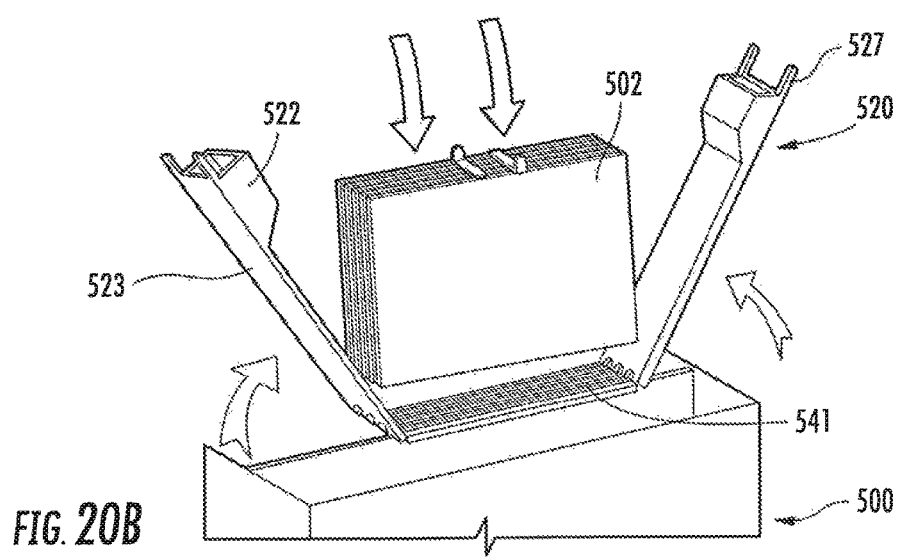

As shown in FIGS. 20A and 20B, the separate apparatus 540 (e.g., a container) may include one or more additional acid pump structures 520 (e.g., in addition to the one or more structures, ridges, and/or trenches 541 provided on or in the bottom surface) in place of or in addition to the side walls. In various exemplary embodiments, each element or cell 502 of the secondary battery 500 may be provided in a separate container 540 to make installing the element or cell 502 easier. In various exemplary embodiments, the acid pump 520 has one or more spacers 527 that extend upward from the acid pump structure 520.

FIG. 21 shows an exemplary element or cell 502 of a secondary battery before installation into the secondary battery. As shown in FIG. 21, each element or cell 502 may be provided with one or more acid pumps 520 and/or one or more separate apparatus to combine (e.g., into a unit) the various components (e.g., of the element or cell). It should be appreciated that, in place of a separate container having walls and a bottom surface, the element or cell 502 and the one or more acid pumps 520 may be banded together, wrapped, or otherwise combined to provide the single unit 540, as shown in FIG. 21. The banding or wrap 544 may be porous and/or may dissolve to allow the aqueous electrolyte to more fully interact with the electrode plates of the element or cell 502, it should also be appreciated that an acid pump according to any exemplary embodiment may be used in place of or in addition to the acid pump 520 shown in FIG. 21.

As shown in FIGS. 22A to 23, in various embodiments, one or more acid pumps 620 may be provided in a generally U-shaped configuration. The one or more acid pumps 620 may be provided in an empty battery housing 601. As shown in FIG. 23, the one or more acid pumps 630 may be molded to enclose or cover the element or cell 602 of the secondary battery on any number of sides (e.g., adjacent two side walls and a bottom surface or adjacent four side walls and a bottom surface). It should be appreciated that the U-shape of the one or more acid pumps 623 may help provide a head tank 632 and/or a throat structure 633. That is, the ends or tops of the one or more acid pumps 630 may be curved or otherwise positioned inward or toward each other to help provide a wider gap between the one or more acid pumps 630 and the sides of the battery housing 601 than in the middle and/or lower regions of the one or more acid pumps 630. The wider gap may be useable as a head tank 632 of the acid pump 630. Likewise, the narrower gap between the middle and lower regions of the one or more acid pumps 630 and the battery housing may be useable as a throat 623 of the one or more acid pumps 630.

FIGS. 24A to 25B show various views of an exemplary separator 706 for a secondary battery. The exemplary separator 706 for a secondary battery shown in FIGS. 24A to 25B includes one or more acid pump structures 725 to allow and/or control the movement of aqueous electrolyte of the secondary battery. As shown in FIGS. 24A to 24C, the exemplary separator 706 includes one or more tubes 728. The one or more tubes 728 are usable to allow or direct aqueous electrolyte to move from one region of the secondary battery to another region of the secondary battery. The tubes 728 shown in FIGS. 24A to 24B may be provided in place of or in addition to the ribs of a traditional separator. Likewise, as shown in FIGS. 25A and 25B, ridges and/or trenches 726 may be provided on the separator 706 to control the movement of the aqueous electrolyte. It should be appreciated that the controlled movement may direct or force the aqueous electrolyte or otherwise allow it to move in a desired direction and/or may prevent or discourage movement in an undesired direction.

FIGS. 26 and 27 show perspective views of a corrugated channel 740 according to various exemplary embodiments. As shown in FIG. 26, the corrugated channel 740 may be provided as a unit with multiple channels or tubes 748 which run from a top surface 751 toward a bottom surface 752 of the corrugated channel 740. As such, aqueous electrolyte may be allowed to enter at or near a top surface 751 of the corrugated channel 740 and exit at or near the bottom surface 752 of the corrugated channel 740. The corrugated channel 740 may be usable as a separator within an element or cell of the battery and/or as a structure around the element or cell. As shown in FIG. 27, the corrugated channel 740 may be bent to, for example, help provide a head tank or reservoir 742 behind the corrugated channel 740 or to discourage fluid flow in an upward direction of the corrugated channel 740.

Figure 28:
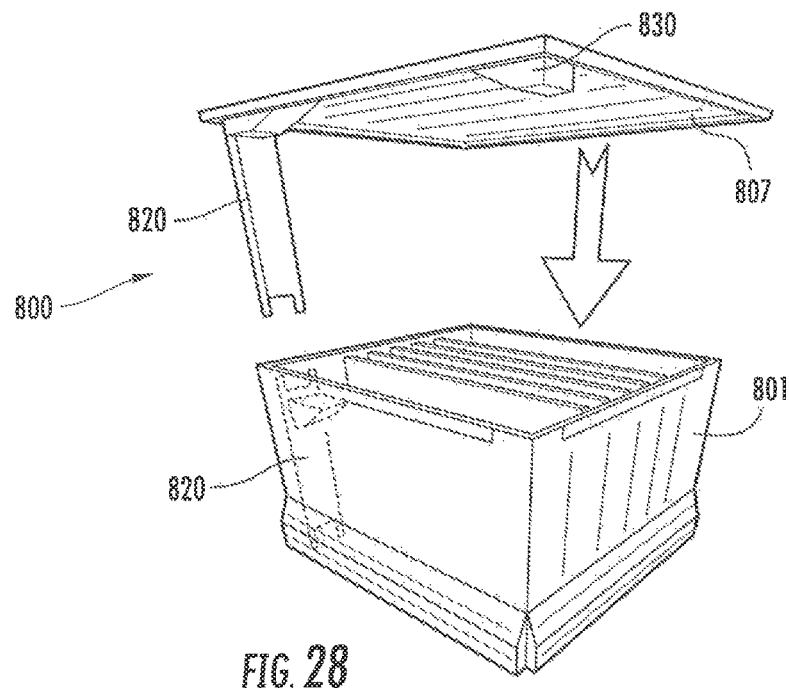
FIG. 28 is a series of isometric views of a secondary battery cover and housing including an acid pump according to various exemplary embodiments.

Referring to FIG. 28, in various exemplary embodiments, one or more acid pumps 820 and/or portions of one or more acid pumps 830 are pre-coupled and/or integrally molded into the cover 807 and/or the battery housing 801 of the secondary battery 800. In various exemplary embodiments, a portion of one or more acid pumps 820 or 830 is pre-coupled or integrally molded into the cover 807 and another portion of the one or more acid pumps 820 or 830 is pre-coupled or integrally molded into the battery housing 801 of the secondary battery 800. In various exemplary embodiments, one or more acid pump 820 is pre-coupled and/or integrally molded into the battery housing 801 of the secondary battery 800. In various embodiments, a pump wall (e.g., a container wall that is taller than an associated element or cell) is pre-coupled, integrally molded, and/or otherwise provided in the battery housing 801. The space between this pump wall and the outer wall of the battery (e.g., the battery housing 801) may be utilized to help provide a head tank or reservoir structure and/or the throat of an acid pump. It should be appreciated that, in various exemplary embodiments utilizing acid pumps 820 or portions of acid pumps 830 integrally molded into the battery cover 807, one or more elements of the battery may be positioned (e.g., as outlined above with regard to FIG. 9) to provide sufficient space to easily install the cover 807, and the acid pump 820 or portion of the acid pump 830 integrally molded into the cover 807, without damaging the battery 800.

Figure 29:
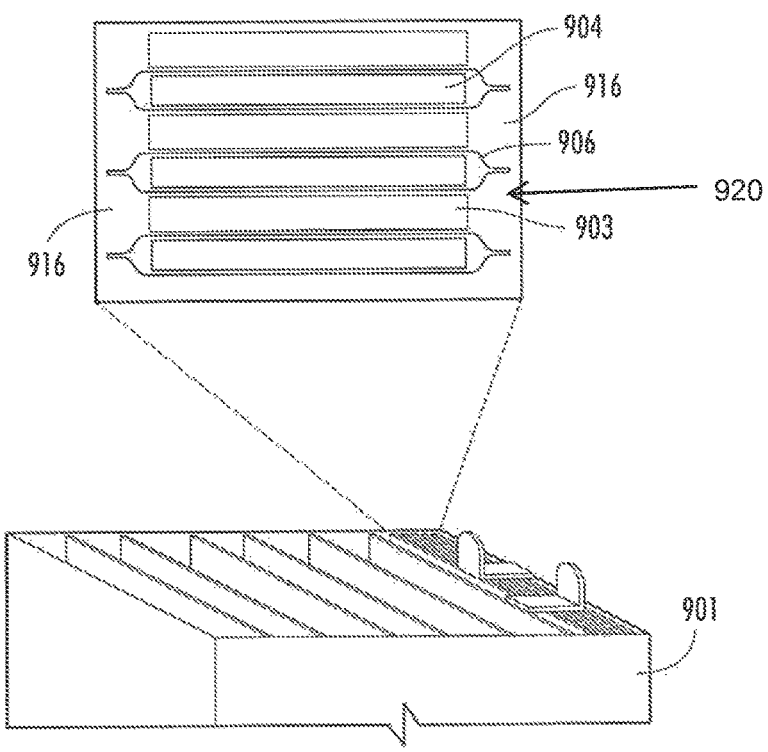
FIG. 29 is a partial isometric view and top plan view of a portion of a secondary battery without cover according to an exemplary embodiment.
Figure 30:
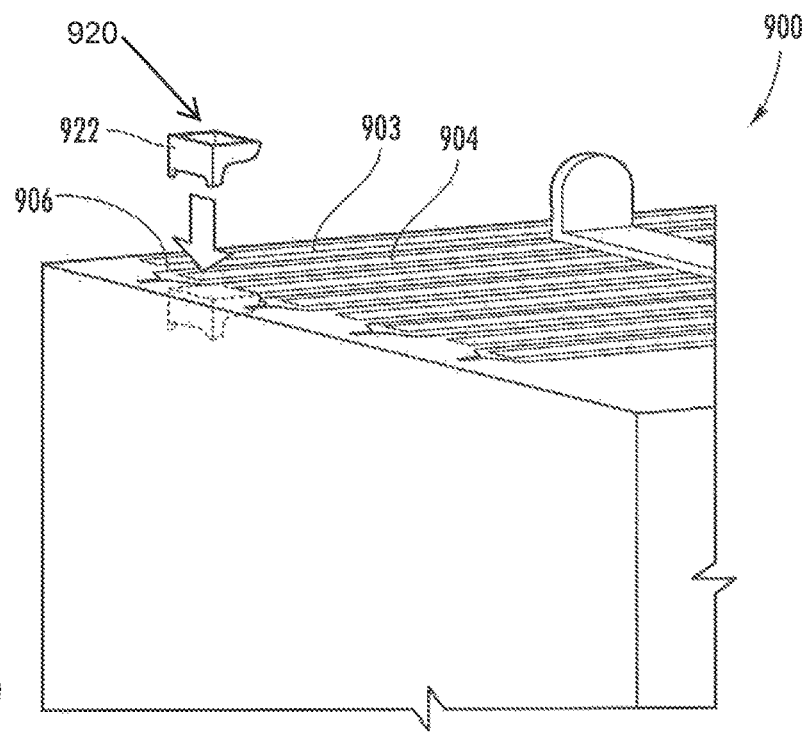
FIG. 30 is a partial isometric view of a secondary battery without cover and an acid pump according to an exemplary embodiment.

FIG. 29 shows an exemplary embodiment of an acid pump 920 that utilizes a separator 906 to help form at least a portion of the acid pump. As shown in FIG. 29, the separator 906 of the secondary battery 900 may be shaped to help create chambers 916. Each chamber 916 is at least partially formed by the one or more separators 906, an electrode plate (e.g., negative electrode 904), and a portion of the battery housing 901. It should be appreciated that, although each separator 906 is shown as being provided or enveloped around the negative electrode plates 904 and creating chambers adjacent the positive electrode plates 903, in various other embodiments, the separator may at least partially envelope or otherwise be provided around the positive plates 903 and/or the chambers 916 may be adjacent the negative electrode plates 904. As shown in FIG. 30, a reservoir 922 may be provided above one or more of the chambers 916 to help the chamber 916 function as the throat of an acid pump 920. That is, the reservoir 922 will collect acid, similar to the manner outlined above with regard to a head tank of an acid pump, and direct the acid down through the chamber 916, similar to the manner outlined above with regard to a throat of an acid pump. In various embodiments, the reservoir 922 may snap onto the battery housing and/or another structure of the secondary battery. It should be appreciated that the reservoir shown in FIG. 30 may also be utilized with any of the described chambers formed in part by one or more separators.

Figure 31:
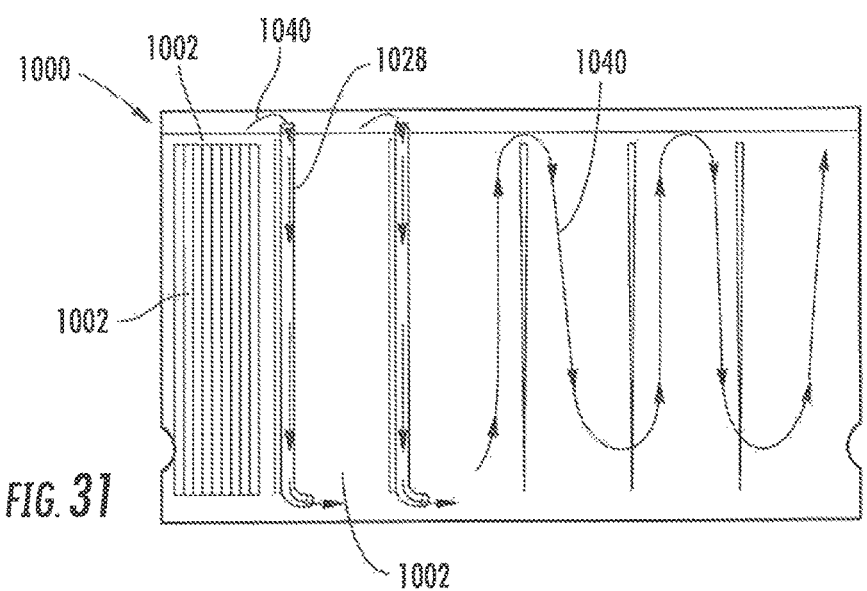
FIG. 31 is a cross-section view of a portion of a secondary battery according to an exemplary embodiment.

Referring to FIG. 31, in various embodiments, one or more gasses created during or otherwise resulting from one or more charging and/or discharging stages is used to promote movement in or of the aqueous electrolyte. As shown in FIG. 31, one or more structures 1028 (e.g., tubes) may be included in the secondary battery 1000 to help direct one or more gasses from one cell to another cell 1002 of the secondary battery 1000. That is, gas created during or resulting from charging and/or discharging stages is provided from a cell 1002 in which the gas was generated to one or more other cells 1002 (e.g., a neighboring cell). In various embodiments, gas is directed to the bottom region of the aqueous electrolyte of the other cell(s) through the tubes 1028. As or after it leaves the tube 1028, the gas migrates through the electrolyte to help mix the electrolyte (e.g., by carrying heavier, denser electrolyte to the top regions of the cell). At least two cells may be interconnected in this manner in a closed loop to help make the circulation of the gases continuous.

Figure 32:
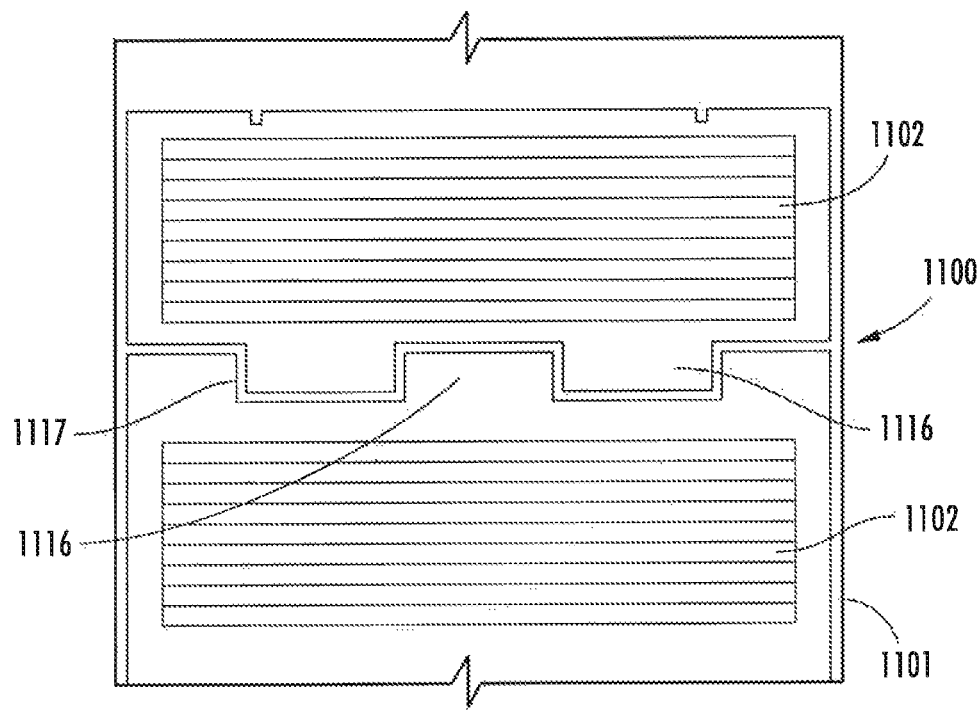
FIG. 32 is a partial top plan view of a secondary battery without cover depicting a cell partition according to an exemplary embodiment.
Figure 33:
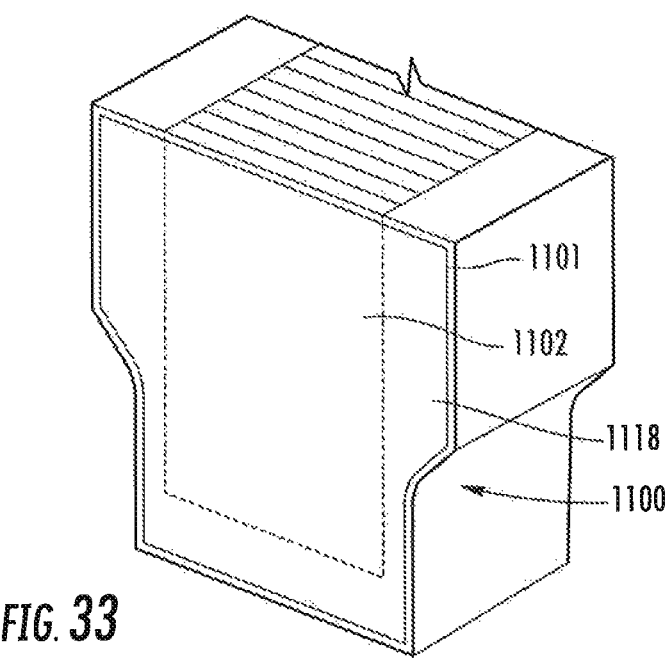
FIG. 33 is a partial perspective view of a secondary battery without cover according to an exemplary embodiment.
Figure 34:
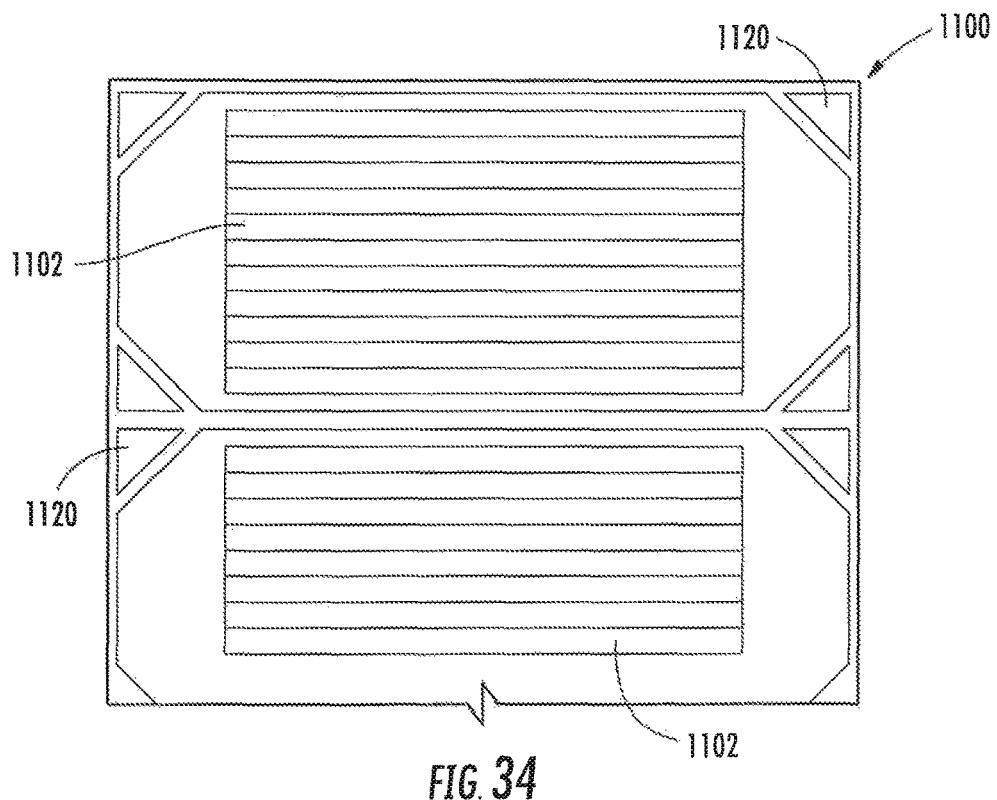
FIG. 34 is a top plan partial view of a secondary battery without cover according to an exemplary embodiment.

Referring to FIGS. 32-34, and as discussed above, the secondary battery 1100 may include cell walls 1117 that help separate the compartments, elements, or cells of the secondary battery. As shown in FIG. 32, one or more cell walls 1117 may be configured to provide one or more consolidated spaces 1116 between the elements or cells 1102 for one or more acid pumps. Additionally, in various embodiments, the one or more consolidated spaces 1116 may be usable as a throat of one or more acid pumps. As shown in FIG. 33, the cell walls 1117 and/or the battery housing 1101 may be formed in a flowerpot shape. The flowerpot shape may be altered to provide additional space 1118 and/or a desired shape for one or more acid pumps. As shown in FIG. 34, one or more acid pumps 1120 or portions of one or more acid pumps 1120 (e.g., channels or throats of the acid pumps) may be provided near each element 1102 or cell of the secondary battery 1100 (e.g., in each corner of the cell). An acid pump 1120 that is placed in a corner of a cell may be desirable because it will help utilize or collect aqueous electrolyte from waves in multiple different directions. Likewise, the additional space between the one or more acid pumps 1120 may help allow for separator run-off.

Figure 35:
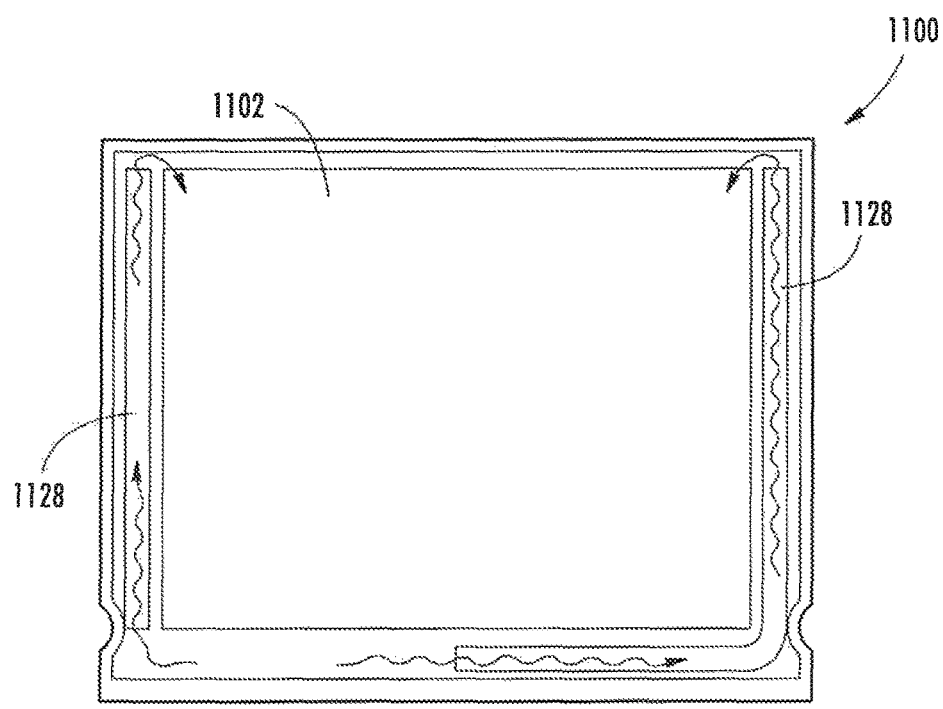
FIG. 35 is a cross-section view of a secondary battery without cover according to an exemplary embodiment.
Figure 36:
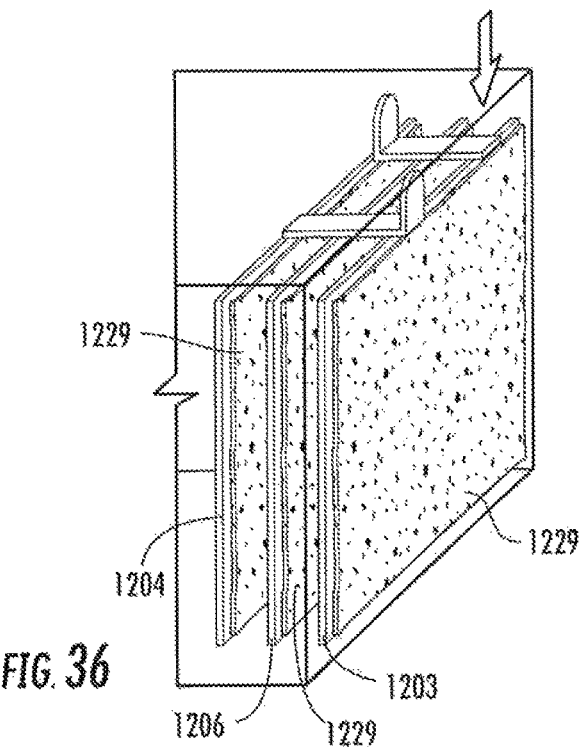
FIG. 36 is a partial isometric view of a secondary battery housing, element and material for preventing or dissipating acid stratification.
Figure 37:
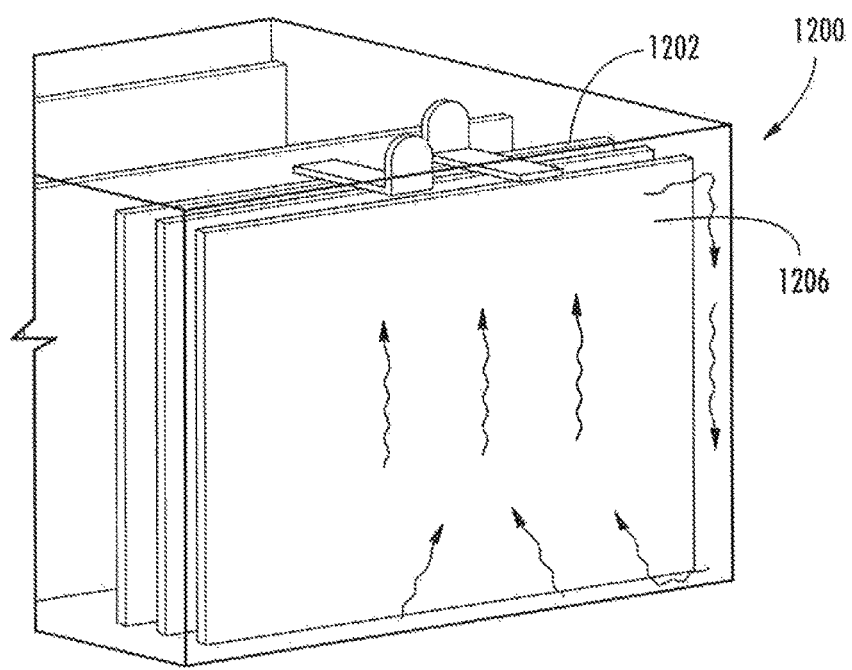
FIG. 37 is a partial isometric view of a secondary battery housing and element according to an exemplary embodiment.

Referring to FIGS. 35-37, in various embodiments, additional materials, members, or apparatuses are provided around the elements or cells 1202 of the secondary battery 1200 to allow, direct, or encourage movement of aqueous electrolyte. As shown in FIG. 35, a porous or fibrous material 1128 (e.g., a sponge-like material) may be provided around one or more elements or cells 1202 of the secondary battery 1200. In various embodiments, the porous or fibrous material 1128 acts like a sponge or candlewick and desirably draws aqueous electrolyte from the bottom of the secondary battery 1200 toward the top of the secondary battery (e.g., through capillary action). As shown in FIG. 36, a gel 1229 or the like may be provided on the electrode plates 1203 and/or 1204 and/or the separator 1206 of the secondary battery 1200. The gel 1229 or the like may contain, for example, ion exchange resin powders to prevent or discourage the aqueous electrolyte from concentrating toward the bottom of the secondary battery 1200 and/or settling into regions of different or varying densities. As shown in FIG. 37, the separator or an additional wrap 1206 may be designed to promote a capillary action that draws aqueous electrolyte from areas of certain concentration (e.g., the bottom of the secondary battery) toward areas of other concentration (e.g., the top of the secondary battery).

Figure 38:
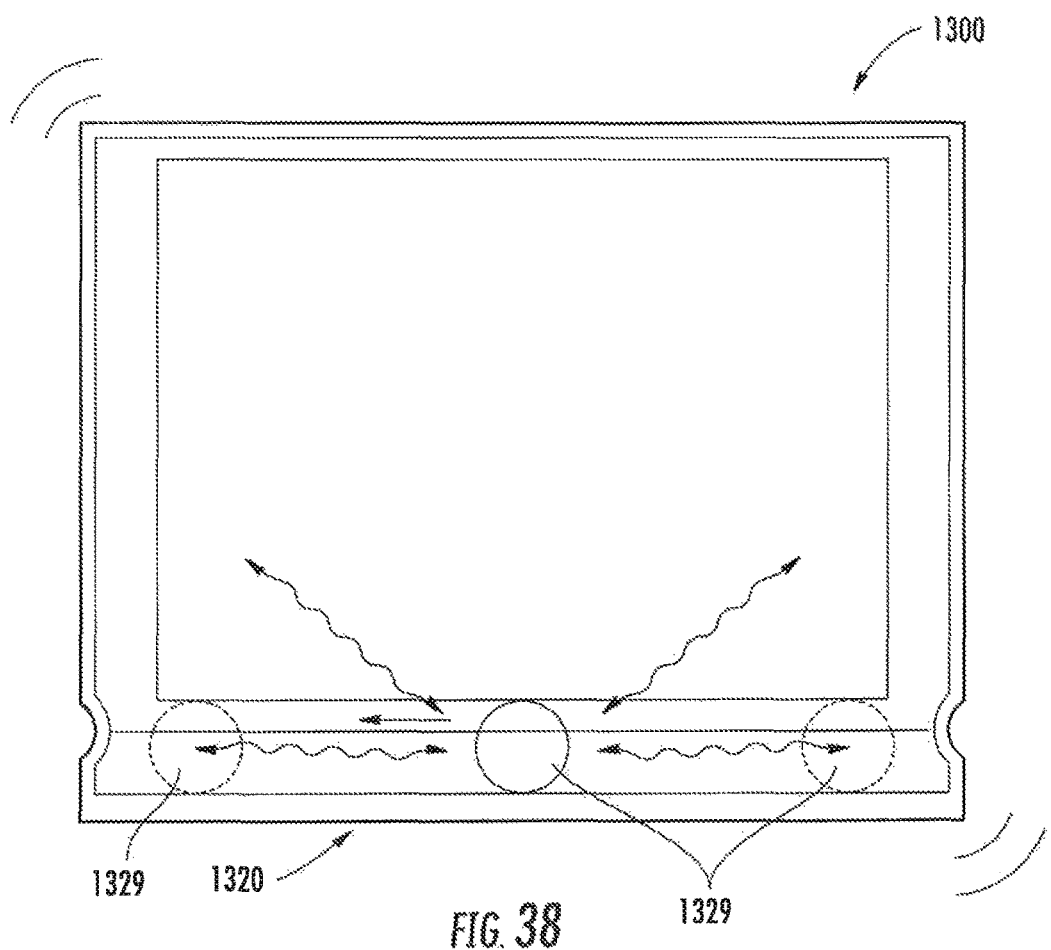
FIG. 38 is a cross-section view of a secondary battery housing without cover according to an exemplary embodiment.

Referring to FIG. 38, an object 1329 such as, for example, a ball made from steel or another material that is not substantially reactive to the chemistry of the secondary battery, may be placed in the secondary battery, and allowed to move within the battery housing. In various embodiments, the movement of the object 1329 causes displacement and/or mixture of the aqueous electrolyte and/or vibrations (e.g., from hitting the battery housing), which help promote interactions within the aqueous electrolyte that stir or mix the aqueous electrolyte.

Figure 39:
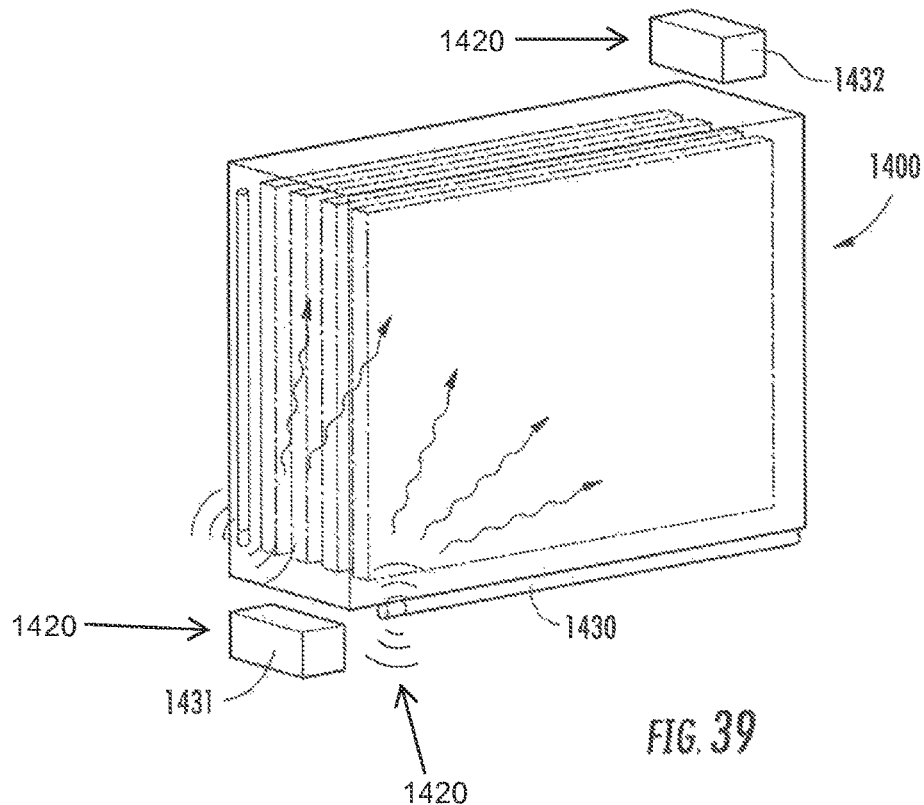
FIG. 39 is an isometric view of a secondary battery cell and apparatus for preventing or dissipating acid stratification according to various exemplary embodiments.

Referring to FIG. 39, a secondary battery 1400 is shown with an exemplary active acid pump 1420. In the exemplary embodiment shown in FIG. 39, the acid pump 1420 includes a sonic wave or vibration-generating device 1430. The generating device 1430 converts energy from an outside source into sound or other vibrational waves that pass through or into the aqueous electrolyte of the secondary battery. The waves help create motion (e.g., vibrations) within the aqueous electrolyte, which helps promote interaction between regions of high density and regions of low density.

Alternatively, as shown in FIG. 39, a hot and/or cold element 1431 or 1432, such as, for example, an electric heater or a thermoelectric cooling device (e.g., a pettier diode), may be used to help create a temperature differential between various regions of the aqueous electrolyte. The temperature differential may help promote movement within the aqueous electrolyte due, at least in part, to thermal interactions of the different regions. This movement may help produce a stirring or mixing effect within the aqueous electrolyte.

Figure 40:
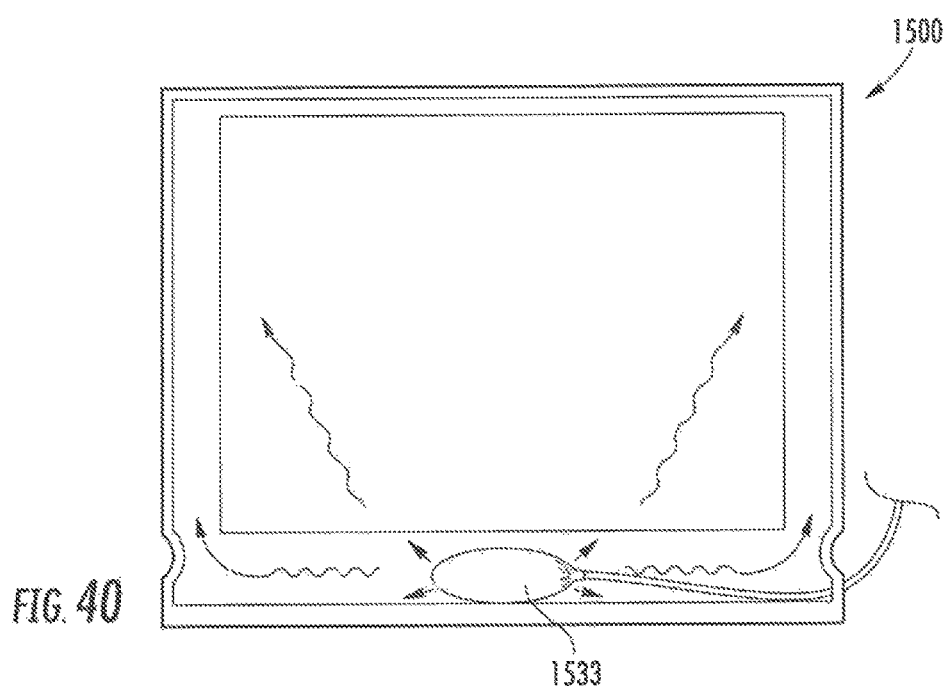
FIG. 40 is a cross-section view of a secondary battery without cover according to an exemplary embodiment.

Referring to FIG. 40, a secondary battery is shown with an exemplary active acid pump 1500. In the exemplary embodiment shown in FIG. 40, the active acid pump 1520 includes a balloon 1533 near the bottom of the battery 1520. The balloon 1533 fills with a fluid (e.g., a gas or a liquid) to cause the balloon 1533 to expand or is drained and allowed to contract. The expanding and/or contracting balloon 1533 displaces the aqueous electrolyte causing movement therein. It should be appreciated that the balloon 1533 may be filled and/or drained at different rates and/or intervals to create different movements within the aqueous electrolyte. For example, the balloon 1533 may be rapidly inflated (e.g., filled) and deflated (e.g., emptied) to help cause rapid movement (e.g., waves) within the electrolyte.

Materials and Construction

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A plate for a lead-acid battery is conventionally made by applying active material or paste to a conductive support such as a lead alloy grid. Plates can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid with a diamond pattern. In various embodiments, the strip is coiled on a winder, and coils of lead alloy strip are stored for later use. In various embodiments, the strip may also be rolled. To form a battery grid, in various embodiments, the strip is fed through an expander that cuts, slits, and stretches a strip of coil to form the grids.

The grids may be produced using other known or later-developed processes. For example, as discussed above, the substrate may be formed by a casting process (e.g., by pouring a melted alloy into a mold), a stamping process, or by continuous rolling. During the manufacture of the grids or the plates, the grid wires may be refinished or reshaped (e.g., to improve adhesion of the paste).

The active material or paste is then applied to or otherwise provided (e.g., pasted by a conventional paster) on the expanded strip or wire grid. In various embodiments, one or more pasting materials or pasting papers are provided on one or both surfaces of the active material. In various embodiments, the pasting materials or paper may be provided in a continuous process.

In various embodiments, the grids, active material and pasting material or paper are fed to a divider where the strip is cut into plates. Plates cut from the strip may be flattened or otherwise modified to help smooth out any uneven regions of paste. In various embodiments, the plates pass (e.g., on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg C. (about 500 deg F.). After drying, the battery plates undergo a chemical treatment, well known to those skilled in the art. The pasted plates are next typically cured for many hours under elevated temperature and humidity to help oxidize any free lead and otherwise adjust the crystal structure of the plate.

Conventional polyolefin battery separators are typically produced by a process that comprises blending a composition of high molecular weight polyolefin, an inert filler material, and/or a plasticizer, forming the composition into sheet form, and subsequently extracting a portion of the inert filler and/or plasticizer from the sheet using a solvent.

After curing, the plates are assembled into batteries. Groupings of individual battery plates may be assembled, enveloped, interleaved or otherwise separated with separator material, and provided together to form plate sets. For example, in one common battery design, every other plate (e.g., each negative plate) in the battery set is inserted into a battery separator in the form of an envelope. The envelope acts as a separator between the plate in the envelope and the adjoining plates in the battery set. The plate sets are assembled in a container to help form a battery.

During assembly, the positive lugs of the battery plates are coupled together and the negative lugs of the battery plates are coupled together. This is typically accomplished using cast-on straps formed by taking assembled battery stacks, inverting them, and dipping the lugs into molten lead provided in a mold. To permit current to follow throughout the battery, cast-on straps of stacks are joined or coupled. Moreover, terminal electrodes are provided which extend through the cover or casing to permit electrical contact with a vehicle's electrical system or other system requiring or intended to use battery power.

In various embodiments, the battery housing, including the cover, is provided containing the battery cells. In various embodiments, the battery housing is submerged in acidic electrolyte fluid in order to fill the battery housing with electrolyte fluid through the fill tube holes in the battery cover. After filling the battery housing with electrolyte fluid, the battery is removed from the electrolyte fluid. Any residual electrolyte fluid coating, dust, and other debris may be washed away to prepare the battery for shipment. Before washing the battery housing external surfaces, the fill tube holes may be plugged to prevent washing fluid from entering the battery housing.

Following the initial wash, the batteries are electrochemically formed by passage of current to convert the lead sulfate or basic lead sulfate(s) to lead dioxide (positive plates) or lead (negative plates). This is referred to as the "formation" process. Depending upon the exemplary embodiment, the acid pump may be included or provided at anytime before formation.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the FIGURES. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the battery or electrodes as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various exemplary embodiments without departing from the spirit or scope of the present inventions.

What is claimed is:

1. A lead-acid battery comprising:
a battery housing comprising:
a base;
a battery housing side wall;
a cell wall; and
a cover;
a battery element provided inside of the battery housing, comprising:
a positive plate,
a negative plate, and
a separator positioned between the positive plate and the negative plate;
a vacant space in the battery housing not occupied by the battery element;
and
an acid pump, the acid pump comprising a throat having a top edge and a head tank in fluid communication with the throat, wherein the throat extends in a direction perpendicular to a bottom surface of the head tank;
wherein the head tank comprises a solid structure having:
a first side wall having a side wall front edge, a side wall back edge, a side wall top edge and a side wall bottom edge; and
a back wall extending parallel to the throat having a back wall first side edge, a back wall second side edge, a back wall top edge, and a back wall bottom edge,
a bottom wall having a bottom wall front edge, a bottom wall back edge, and a bottom wall side edge;
the first side wall being coupled to the bottom wall along an intersection between the bottom wall side edge and the side wall bottom edge;
the back wall being coupled to the bottom wall along an intersection between the bottom wall back edge and the back wall bottom edge;
the first side wall being coupled to the back wall along an intersection between the back wall side edge and the side wall back edge;
the first side wall having a height measured from the side wall bottom edge to the side wall top edge which decreases from a tallest point at the intersection between the side wall back edge and the back wall side edge towards the side wall front edge;
wherein the first side wall, the back wall, the bottom wall, and a second side wall comprise the head tank such that the head tank has an open side defined on two sides by the bottom wall front edge and side wall front edge, the throat top edge being coupled to the bottom wall front edge and extending perpendicularly from the bottom wall;
and
wherein the acid pump is an insert comprising a separate structure from the battery housing including at least the head tank;
wherein at least a portion of the vacant space is occupied by the acid pump; and
wherein at least a portion of the acid pump is an integral part of, attached to, or in communication with the battery housing.

2. The lead-acid battery of claim 1 wherein at least a portion of the vacant space is formed by placing the battery element offset from center in the battery housing.

3. The lead-acid battery of claim 1 wherein:
the separator has a width greater than the width of the positive plate and the negative plate; and
at least a portion of the vacant space is formed by configuring the separator and the positive plate and the negative plate such that the vacant space is created between an end of a positive plate or a negative plate and a portion of the battery housing.

4. The lead-acid battery of claim 1 wherein at least a portion of the vacant space is formed by the cell wall being shaped to form vacant space between the cell wall and the battery element.

5. The lead-acid battery of claim 1 wherein at least a portion of the acid pump is part of or connected to the cover.

6. The lead-acid battery of claim 1 wherein at least a portion of the acid pump is part of or connected to the battery housing side wall and/or the cell wall.

7. The lead-acid battery of claim 1, wherein the first side wall and the second side wall extend perpendicularly from the bottom surface.

8. The lead-acid battery of claim 7, wherein the head tank has a mouth in a top region and is seated above the throat.

9. The lead-acid battery of claim 1, wherein the head tank has a mouth in a top region and is seated above the throat.

10. The lead-acid battery of claim 1, wherein the head tank first side wall is joined perpendicularly to the bottom surface.

11. The lead-acid battery of claim 1, wherein the second side wall is coupled to the back wall along the back wall second side edge, the second side wall decreasing in height as it extends away from the back wall towards the open side.

12. The lead-acid battery of claim 1, wherein the throat includes two or more parallel ridges.

13. The lead-acid battery of claim 12, wherein the ridges extend in a perpendicular direction away from the bottom surface.

14. The lead-acid battery of claim 1, wherein at least a portion of the acid pump is divided into a plurality of sections.

15. A lead-acid battery comprising:
a battery housing;
an acid pump, at least a portion of which is an integral part of, attached to, or in communication with the battery housing, the acid pump comprising:
a throat and a head tank in fluid communication with the throat, wherein the head tank is defined by a solid structure having:
a back wall;
a first side wall having a first side wall front edge, first side wall back edge, a first side wall bottom edge, and a first side wall top edge;
a second side wall having a second side wall front edge and a second side wall back edge; and
a base having a base front edge and base back edge;
wherein the back wall is perpendicularly coupled to the first side wall along the first side wall back edge, second side wall along the second side wall back edge, and base along the base back edge;
wherein the first side wall and second side wall are perpendicularly coupled to the base;
wherein the first side wall has a height measured from the first side wall bottom edge to the first side wall top edge, the height decreasing from the first side wall back edge towards the first side wall front edge,
wherein the first side wall front edge, second side wall front edge, and base front edge define an open side; and
wherein the throat has a top edge coupled to the bottom wall front edge and the throat extends in a perpendicular direction away from the base.

16. The lead-acid battery of claim 15, wherein the throat includes two or more parallel ridges.

17. The lead-acid battery of claim 16, wherein the ridges extend in a perpendicular direction away from the base.

18. The lead-acid battery of claim 15, wherein at least a portion of the acid pump is divided into a plurality of sections.

19. The lead-acid battery of claim 15, wherein at least one of the first and second side walls have a first and second height, the first height being taller than the second height, wherein the first height is closer to the back wall than the second height.

20. The lead-acid battery of claim 15, wherein the first and second sidewalls extend perpendicularly away from the back wall, and wherein the first and second sidewalls decrease in height as they extend away from the back wall.

21. The lead-acid battery of claim 15, wherein the first and second sidewalls have a first height which is greater closer to the back wall than a second height farther away from the back wall.

22. An acid pump for a lead-acid battery, the acid pump comprising:
    a throat and a head tank in fluid communication with the throat;
    wherein the head tank is defined by a solid structure having a back wall, first side wall, a second side wall, and a base;
    the first side wall having a first side wall front edge, a first side wall back edge, a first side wall top edge, and a first side wall bottom edge, the first side wall having a height as measured from the first side wall bottom edge to the first side wall top edge, the height decreasing from the first side wall back edge towards the first side wall front edge;
    the second side wall having a second side wall front edge and a second side wall back edge;
    the base having a base front edge coupled to a top edge of the throat, the throat extending in a perpendicular direction away from the base;
    the back wall extending from the base in a direction parallel to the throat and perpendicularly coupled to the first side wall back edge and second side wall back edge;
    wherein the first side wall front edge, second side wall front edge, and base front edge define an open side.

23. The acid pump of claim 22, wherein the first and second side walls extend perpendicularly from the base.

24. The acid pump of claim 22, wherein the first and second side walls decrease in height in a direction extending away from the back wall.

25. A lead-acid battery having the acid pump of claim 22.

26. The acid pump of claim 22, wherein the first and second side walls are taller closer to the back wall and shorter closer to the throat.

27. A battery having a battery housing and the acid pump of claim 22, wherein the acid pump is an insert comprising a separate structure from the battery housing including at least the head tank.

* * * * *

UNITED STATES PATENT AND TRADEMARK OFFICE
CERTIFICATE OF CORRECTION

PATENT NO. : 10,050,254 B2
APPLICATION NO. : 13/393972
DATED : August 14, 2018
INVENTOR(S) : Jin et al.

Page 1 of 2

It is certified that error appears in the above-identified patent and that said Letters Patent is hereby corrected as shown below:

1. On Page 2, in Item (57), under "ABSTRACT", in Column 1, Lines 1-2, delete "embodiments;" and insert -- embodiments, --, therefor.

2. On Page 2, in Item (57), under "ABSTRACT", in Column 1, Line 4, delete "and or" and insert -- and/or --, therefor.

3. In Column 1, Line 7, delete "international" and insert -- International --, therefor.

4. In Column 3, Line 36, delete "shows" and insert -- show --, therefor.

5. In Column 3, Line 45, delete "is an isometric view" and insert -- are isometric views --, therefor.

6. In Column 6, Line 53, delete "container, in" and insert -- container. In --, therefor.

7. In Column 6, Line 65, delete "FIG. 3-4," and insert -- FIGS. 3-4, --, therefor.

8. In Column 8, Line 32, delete "polyolefin," and insert -- (e.g., polyolefin, --, therefor.

9. In Column 9, Line 64, delete "electrolyte," and insert -- electrolyte --, therefor.

10. In Column 11, Line 23, delete "in various" and insert -- In various --, therefor.

11. In Column 11, Line 55, delete "and or" and insert -- and/or --, therefor.

12. In Column 13, Line 14, delete "502, it" and insert -- 502. It --, therefor.

13. In Column 16, Line 17, delete "pettier" and insert -- peltier --, therefor.

14. In Column 19, Line 24, in Claim 1, delete "edge; and" and insert -- edge; --, therefor.

Signed and Sealed this
Twenty-sixth Day of February, 2019

Andrei Iancu
*Director of the United States Patent and Trademark Office*

15. In Column 19, Line 27, in Claim 1, delete "edge," and insert -- edge; and --, therefor.

16. In Column 20, Line 59, in Claim 15, delete "edge," and insert -- edge; --, therefor.